US007720261B2

(12) United States Patent
Hiraizumi et al.

(10) Patent No.: US 7,720,261 B2
(45) Date of Patent: May 18, 2010

(54) IMAGE PROCESSING APPARATUS, IMAGE PROCESSING METHOD, PROGRAM, AND RECORDING MEDIUM

(75) Inventors: Kei Hiraizumi, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 11/554,813

(22) Filed: Oct. 31, 2006

(65) Prior Publication Data

US 2007/0127785 A1 Jun. 7, 2007

(30) Foreign Application Priority Data

Dec. 7, 2005 (JP) ............................ 2005-353026

(51) Int. Cl.
*G06K 9/00* (2006.01)
*H04N 5/228* (2006.01)

(52) U.S. Cl. ................... 382/103; 382/291; 348/208.14

(58) Field of Classification Search ................ 382/100, 382/103, 106, 107, 108, 115, 116, 117, 118, 382/168, 172, 181, 190, 191, 199, 201, 203, 382/209, 219, 232, 243, 255, 274, 276, 286–296, 382/305, 312; 348/222.1, 208.14
See application file for complete search history.

(56) References Cited

U.S. PATENT DOCUMENTS 7,440,594 B2 * 10/2008 Takenaka .................... 382/118
7,502,496 B2 * 3/2009 Kozakaya et al. ........... 382/118
7,551,755 B1 * 6/2009 Steinberg et al. ............ 382/118
7,574,016 B2 * 8/2009 Steinberg et al. ............ 382/103
7,593,552 B2 * 9/2009 Higaki et al. ............... 382/118
7,596,247 B2 * 9/2009 Ioffe .......................... 382/118
7,616,233 B2 * 11/2009 Steinberg et al. ......... 348/222.1

FOREIGN PATENT DOCUMENTS

JP 9-245171 9/1997
JP 10-232934 9/1998
JP 2001-338290 12/2001
JP 2003-323622 A 11/2003
JP 2004-110813 4/2004

* cited by examiner

*Primary Examiner*—Seyed Azarian
(74) *Attorney, Agent, or Firm*—Oblon, Spivak, McClelland, Maier & Neustadt, L.L.P.

(57) ABSTRACT

An image processing apparatus includes a detecting unit for detecting a position of a facial feature in a face image, a principal component analysis performing unit for performing principal component analysis on the position of the facial feature in a registered image that is a pre-registered face image, a first evaluation value calculating unit for calculating a first evaluation value that is used to evaluate the position of the facial feature in a target image relative to the principal component obtained in the principal component analysis operation, and a first determining unit for determining whether or not the face in the target image matches the face in the registered image by comparing the calculated first evaluation value with a first threshold set based on the position of the facial feature in the registered image relative to the principal component.

10 Claims, 16 Drawing Sheets

FACE IMAGES OF SUBJECT PERSON
11
CONVERTING UNIT
12
FEATURE POSITION/ MOVABLE RANGE CALCULATING UNIT
FEATURE MOVABLE RANGE DATA
AVERAGE FEATURE POSITION DATA
13
FEATURE INFORMATION STORAGE UNIT
FEATURE MOVABLE RANGE DATA
AVERAGE FEATURE POSITION DATA
14
DETERMINING UNIT
17
DETERMINATION RESULT OUTPUTTING UNIT
15
IMAGE CAPTURING UNIT
16
CONVERTING UNIT
1

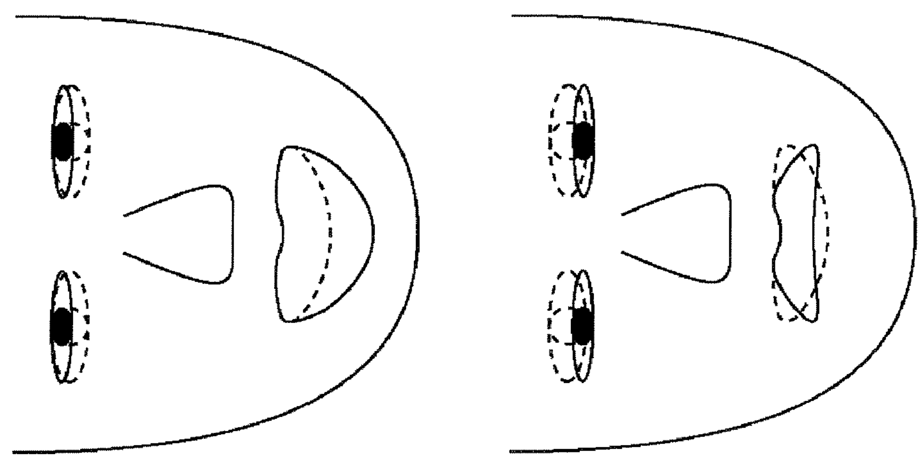
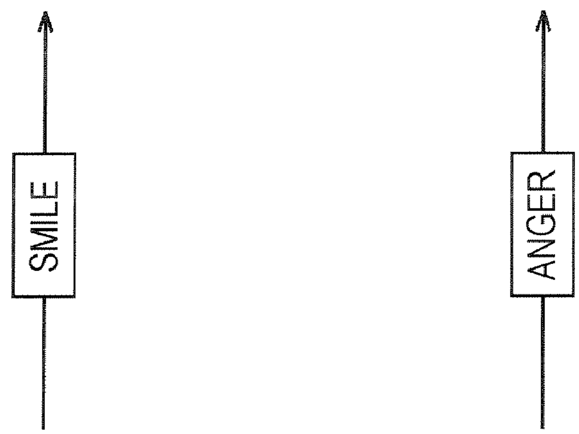
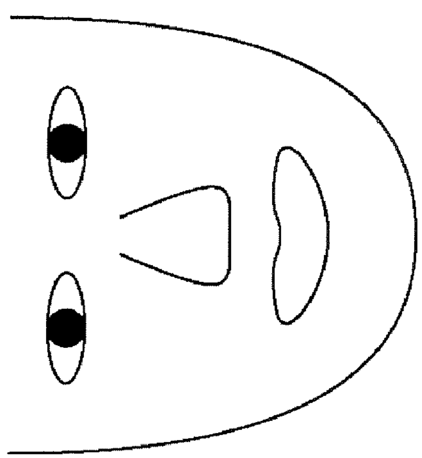
FIG. 3

FIG. 4
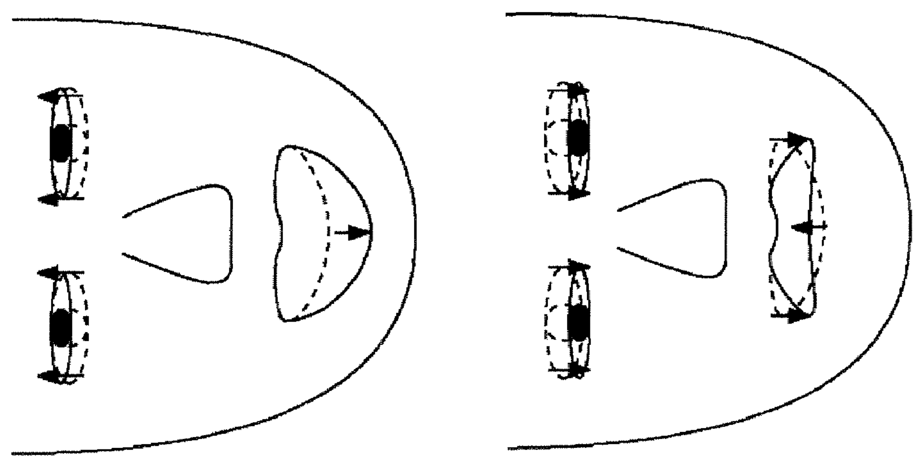
SMILE
ANGER
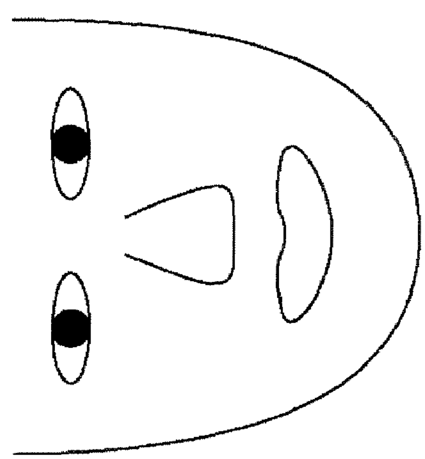

51-1
51-2
51-3
52-1
52-2
52-3
PRINCIPAL COMPONENT ANALYSIS
53
54
55

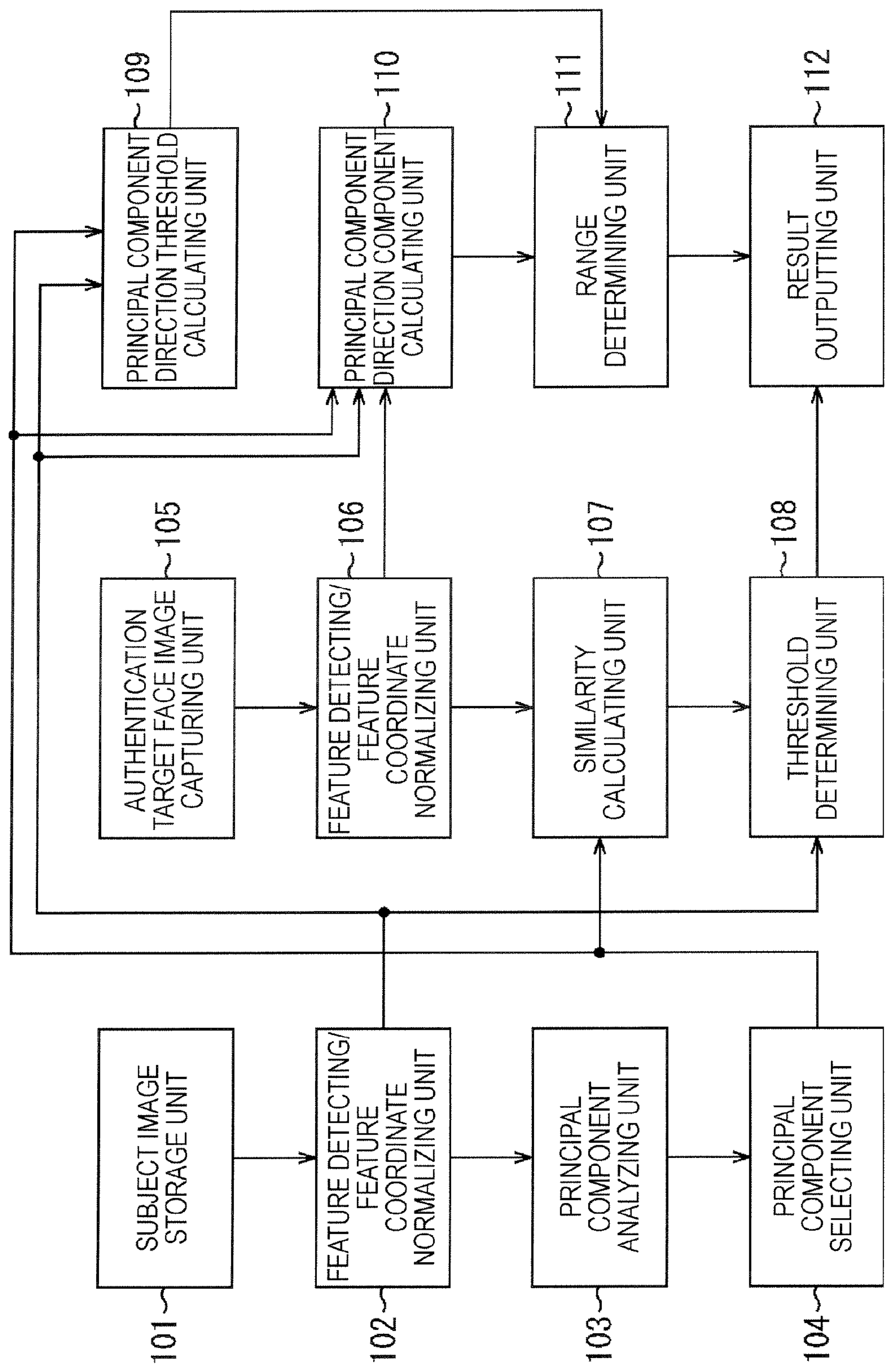
FIG. 8
SUBJECT IMAGE STORAGE UNIT
101
FEATURE DETECTING/ FEATURE COORDINATE NORMALIZING UNIT
102
PRINCIPAL COMPONENT ANALYZING UNIT
103
PRINCIPAL COMPONENT SELECTING UNIT
104
AUTHENTICATION TARGET FACE IMAGE CAPTURING UNIT
105
FEATURE DETECTING/ FEATURE COORDINATE NORMALIZING UNIT
106
SIMILARITY CALCULATING UNIT
107
THRESHOLD DETERMINING UNIT
108
PRINCIPAL COMPONENT DIRECTION THRESHOLD CALCULATING UNIT
109
PRINCIPAL COMPONENT DIRECTION COMPONENT CALCULATING UNIT
110
RANGE DETERMINING UNIT
111
RESULT OUTPUTTING UNIT
112

FIG. 10
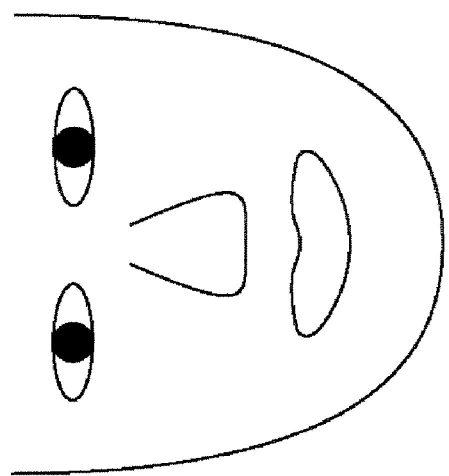
DETECT POSITION OF EACH FEATURE (PARTS OF FACE)
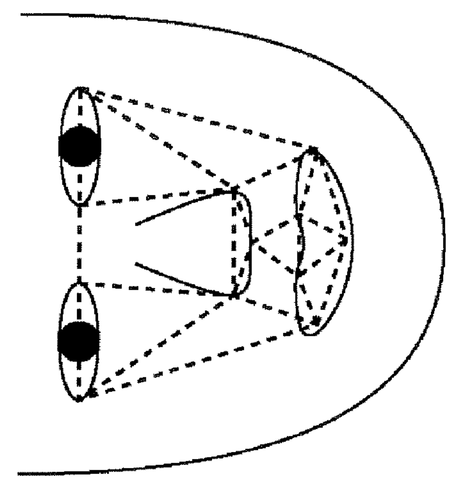

FIRST PRINCIPAL COMPONENT $a_0$
Max
$\beta$
Min
MEAN $\bar{x}$
$x_1$
$y_1$

IMAGE PROCESSING APPARATUS, IMAGE PROCESSING METHOD, PROGRAM, AND RECORDING MEDIUM

CROSS REFERENCES TO RELATED APPLICATIONS

The present invention contains subject matter related to Japanese Patent Application JP 2005-353026 filed in the Japanese Patent Office on Dec. 7, 2005, the entire contents of which are incorporated herein by reference.

BACKGROUND OF THE INVENTION

1. Field of the Invention

The present invention relates to image processing apparatuses, image processing methods, programs, and recording media. In particular, the present invention relates to an image processing apparatus and an image processing method for processing face images, a program causing a computer to execute the method, and a recording medium having the program recorded thereon.

2. Description of the Related Art

Face image authentication techniques that allow authentication of whether or not face images match faces of pre-registered persons are known.

Authentication of whether or not face images match faces of pre-registered persons becomes difficult, when facial expressions of the target persons to be authenticated change. Accordingly, an authentication level is adjusted in some cases. For example, some techniques do not employ images of facial features that change as the facial expressions change in face images of the target persons to be authenticated for the authentication. Other techniques lower criteria (i.e., thresholds) used for the authentication while taking a risk of authenticating other persons as the subject persons by mistake into account so as to decrease an error of determining the subject persons as other persons.

A person identification device is known (see, for example, Japanese Unexamined Patent Application Publication No. 2004-110813). The person identification device includes a characteristic storage unit in which a face image of a person is pre-stored, a first input unit that receives face image data used for performing authentication of the person, arithmetic processing means that performs, after detecting characteristics of the face image of the person from the face image data, arithmetic processing on the characteristics, a second input unit that determines whether or not the arithmetic processing result matches with the face image of the person and receives facial expression data of the person on the basis of the matched data, arithmetic processing means that performs, after detecting characteristics of the facial expression from the facial expression data, arithmetic processing on the characteristics, and an authentication unit that determines whether or not a result of the arithmetic processing of the image data fed from the second input unit matches with the facial expression of the person and outputs matched data.

SUMMARY OF THE INVENTION

As described above, there is a risk of authenticating subject persons as other persons when their facial expressions change. Lowering criteria of authentication in order to prevent such circumstances from occurring conversely increases a possibility of authenticating other persons as the subject persons.

Embodiments of the present invention are made in view of such circumstances, and allow more accurate face authentication even if facial expressions change.

An image processing apparatus according to an embodiment of the present invention includes detecting means for detecting a position of a facial feature in a face image, principal component analysis performing means for performing a principal component analysis operation on the position of the facial feature in a registered image that is a pre-registered face image to obtain a principal component, first evaluation value calculating means for calculating a first evaluation value that is used to evaluate the position of the facial feature in a target image, which is a face image to be authenticated, relative to the principal component obtained in the principal component analysis operation, and first determining means for determining whether or not the face in the target image matches the face in the registered image by comparing the calculated first evaluation value with a first threshold set on the basis of the position of the facial feature in the registered image relative to the principal component.

The first evaluation value calculating means may calculate the first evaluation value relative to the principal component on the basis of the position of the facial feature in the target image and the position of the facial feature in the registered image.

The first evaluation value calculated by the first evaluation value calculating means may indicate a distance between the principal component and the position of the facial feature in the target image.

The first evaluation value calculated by the first evaluation value calculating means may be a square root of a result of subtracting a sum of squares of inner products of a first difference vector and each principal component vector, indicating each of the principal components, from a square of a magnitude of the first difference vector, which results from subtracting a vector indicating a mean value of the positions of the facial features in the registered image from a vector indicating the positions of the facial features in the target image.

The first determining means may determine that the face in the target image matches the face in the registered image when the first evaluation value is lower than a first threshold, which is a maximum value among square roots of results of subtracting a sum of squares of inner products of a second difference vector and each principal component vector from a square of a magnitude of the second difference vector, which indicates the difference between a vector indicating the positions of the facial features in each registered image and a vector indicating a mean value of the positions of the facial features in the registered image.

The image processing apparatus may further include threshold calculating means for calculating a second threshold, which is in a direction orthogonal to the direction of the first threshold, from the position of the facial feature in the registered image relative to the principal component, second evaluation value calculating means for calculating a second evaluation value, which is used to the position of the facial feature in the target image relative to the principal component and is in the direction orthogonal to the direction of the first evaluation value, and second determining means for determining whether or not the face in the target image matches the face in the registered image by comparing the second evaluation value with the second threshold.

The second threshold calculated by the threshold calculating means may be composed of maximum and minimum values of the position of the facial feature in the registered image in a direction of the principal component. The second evaluation value calculated by the second evaluation value calculating means may be an inner product of a difference vector, which results from subtracting the vector indicating the mean value of the positions of facial features in the registered image from the vector indicating each position of facial features in the target image, and the principal component vector indicating each of the principal component. The second determining means may determine whether or not the face in the target image matches the face in the registered image on the basis of whether or not the second evaluation value is within a range indicated by the maximum and minimum values of the second threshold.

An image processing method according to another embodiment of the present invention includes the steps of detecting a position of a facial feature in a face image, performing a principal component analysis operation on the position of the facial feature in a registered image that is a pre-registered face image, calculating a evaluation value that is used to evaluate the position of the facial feature in a target image, which is a face image to be authenticated, relative to the principal component obtained in the principal component analysis operation, and determining whether or not the face in the target image matches the face in the registered image by comparing the calculated evaluation value with a threshold set on the basis of the position of the facial feature in the registered image relative to the principal component.

A program causing a computer to execute a process according to an embodiment of the present invention, the process includes the steps of detecting a position of a facial feature in a face image, performing a principal component analysis operation on the position of the facial feature in a registered image that is a pre-registered face image, calculating an evaluation value that is used to evaluate the position of the facial feature in a target image, which is a face image to be authenticated, relative to the principal component obtained in the principal component analysis operation, and determining whether or not the face in the target image matches the face in the registered image by comparing the calculated evaluation value with a threshold set on the basis of the position of the facial feature in the registered image relative to the principal component.

According to an embodiment of the present invention, a position of a facial feature in a face image is detected, principal component analysis is performed on the position of the facial feature in a registered image that is a pre-registered face image, an evaluation value that is used to evaluate the position of the facial feature in a target image, which is a face image to be authenticated, is calculated relative to the principal component obtained in the principal component analysis, and whether or not the face in the target image matches the face in the registered image is determined by comparing the calculated evaluation value with a threshold set on the basis of the position of the facial feature in the registered image relative to the principal component.

As described above, an embodiment of the present invention implements the face authentication.

Another embodiment of the present invention implements a more accurate face authentication even if facial expression changes.

BRIEF DESCRIPTION OF THE DRAWINGS

FIG. 3 shows an example of a change in a human face image when a facial expression changes;

FIG. 4 shows an example of a change in a human face image when a facial expression changes;

FIG. 8 is a block diagram showing another configuration of an image processing apparatus according to an embodiment of the present invention;

FIG. 10 illustrates an example of detecting facial features of a subject person;

DESCRIPTION OF THE PREFERRED EMBODIMENTS

Figure 1:
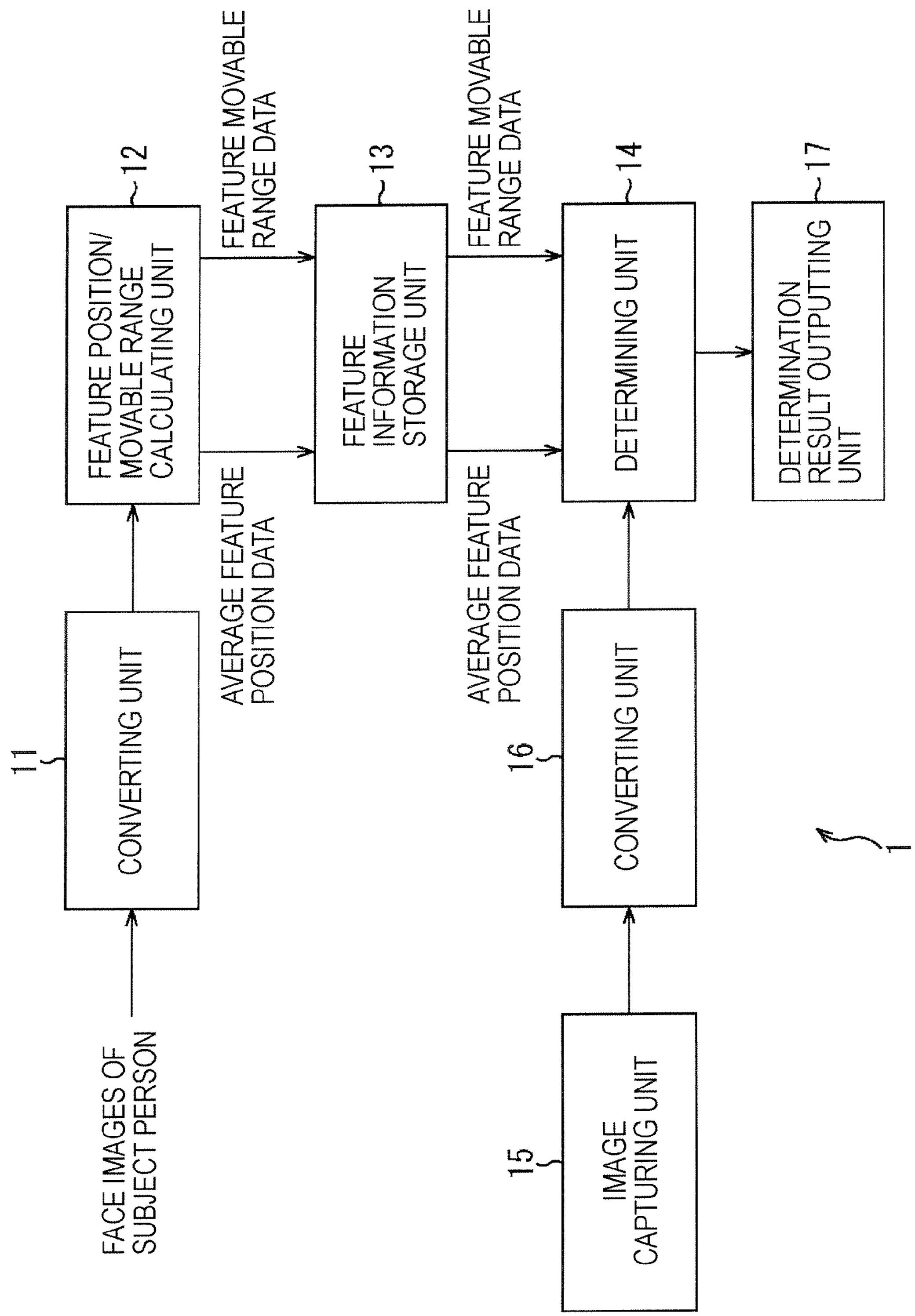
FIG. 1 is a block diagram showing a configuration of an image processing apparatus according to an embodiment of the present invention.

Before describing embodiments of the present invention, the correspondence between the features of the present invention and the embodiments of the present invention described in the specification or the drawings is discussed below. This description is intended to assure that embodiments supporting the claimed invention are described in this specification or the drawings. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus according to an embodiment of the present invention firstly includes detecting means (for example, a feature detecting/feature coordinate normalizing unit 102 or 108 shown in FIG. 8) for detecting a position of a facial feature in a face image, principal component analysis performing means (for example, a principal component analyzing unit 103 shown in FIG. 8) for performing a principal component analysis operation on the position of the facial feature in a registered image that is a pre-registered face image to obtain a principal component, first evaluation value calculating means (for example, similarity calculating unit 107 shown in FIG. 8) for calculating a first evaluation value that is used to evaluate the position of the facial feature in a target image, which is a face image to be authenticated, relative to the principal component obtained in the principal component analysis operation, and first determining means (for example, a threshold determining unit 108 shown in FIG. 8) for determining whether or not the face in the target image matches the face in the registered image by comparing the calculated first evaluation value with a first threshold set on the basis of the position of the facial feature in the registered image relative to the principal component.

The apparatus according to the embodiment of the present invention further includes threshold calculating means (for example, a principal component direction threshold calculating unit 109 shown in FIG. 8) for calculating a second threshold, which is in a direction orthogonal to the direction of the first threshold, from the position of the facial feature in the registered image relative to the principal component, second evaluation value calculating means (for example, a principal component direction component calculating unit 110 shown in FIG. 8) for calculating a second evaluation value, which is used to evaluate the position of the facial feature in the target image relative to the principal component and is in the direction orthogonal to the direction of the first evaluation value, and second determining means (for example, a range determining unit 111 shown in FIG. 8) for determining whether or not the face in the target image matches the face in the registered image by comparing the second evaluation value with the second threshold.

Figure 9:
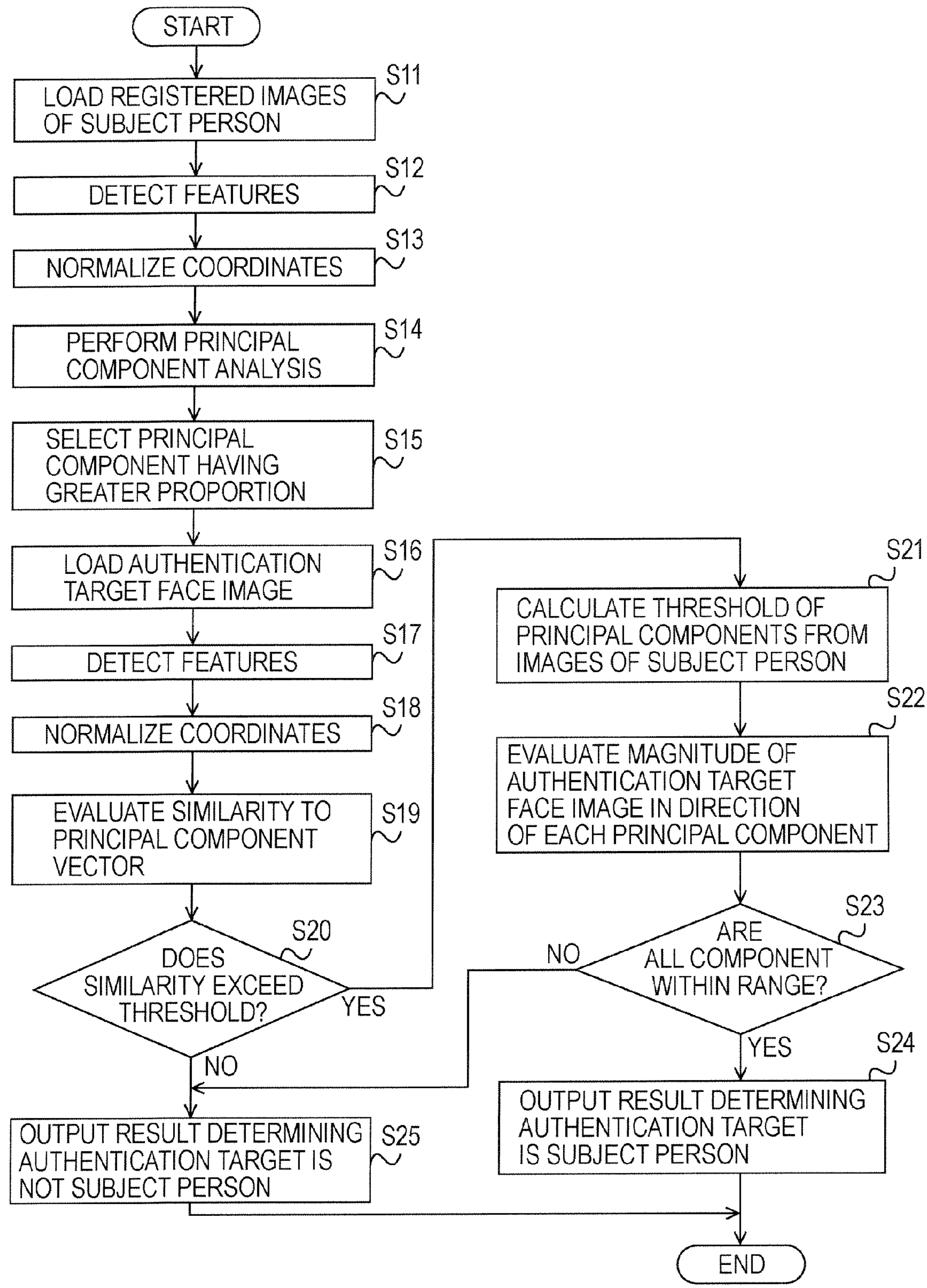
FIG. 9 is a flowchart illustrating authentication processing.

An image processing method or a program according to another embodiment of the present invention includes the steps of detecting a position of a facial feature in a face image (for example, STEP S12 or S17 shown in FIG. 9), performing a principal component analysis operation on the position of the facial feature in a registered image that is a pre-registered face image (for example, STEP S14 shown in FIG. 9), calculating a evaluation value that evaluates the position of the facial feature in a target image, which is a face image to be authenticated, relative to the principal component obtained in the principal component analysis operation (for example, STEP S19 shown in FIG. 9), and determining whether or not the face in the target image matches the face in the registered image by comparing the calculated evaluation value with a threshold set on the basis of the position of the facial feature in the registered image relative to the principal component (for example, STEP S20 shown in FIG. 9).

FIG. 1 is a block diagram showing a configuration of an image processing apparatus 1 according to an embodiment of the present invention. The image processing apparatus 1 includes a converting unit 11, a feature position/movable range calculating unit 12, a feature information storage unit 13, a determining unit 14, an image capturing unit 15, a converting unit 16, and a determination result outputting unit 17.

The converting unit 11 obtains a plurality of face images of a subject person with various facial expressions. From the obtained face images, the converting unit 11 finds positions of facial features, such as eyes, nose, and mouth, in the face images.

The converting unit 11 then supplies the found feature information indicating the positions of the facial features to the feature position/movable range calculating unit 12.

The feature position/movable range calculating unit 12 performs a statistical operation on the feature information for each subject person supplied from the converting unit 11. For example, the feature position/movable range calculating unit 12 calculates an average of the position of each facial feature for each subject person. In addition, for example, the feature position/movable range calculating unit 12 calculates a range of the position of the facial features for each subject person by calculating maximum and minimum values of the position of each facial feature. The feature position/movable range calculating unit 12 then supplies the average position data of the facial features indicating the average position of the subject person's facial feature and the movable range data of the facial features indicating the movable range of the subject person's facial feature to the feature information storage unit 13.

The feature information storage unit 13 stores (or records) the average position data and the movable range data of the facial features. More specifically, the feature information storage unit 13 stores the average position data and the movable range data beforehand to prepare authentication of a face image captured by the image capturing unit 15.

The feature information storage unit 13 supplies the average position data and the movable range data recorded therein to the determining unit 14.

The image capturing unit 15 may include a digital still camera or a digital video camera. The image capturing unit 15 captures the face of the subject person and supplies the captured face image of the subject person to the converting unit 16.

The converting unit 16 has the same configuration as the converting unit 11. The converting unit 16 obtains the face image supplied from the image capturing unit 15. From the obtained face image, the converting unit 16 finds positions of facial features, such as eyes, nose, and mouth, in the face image. The converting unit 16 then supplies the found feature information indicating the positions of the facial features to the determining unit 14.

The determining unit 14 determines whether or not the face image captured by the image capturing unit 15 is the face of the subject person. The determining unit 14 performs this determination on the basis of the average position data and the movable range data supplied from the feature information storage unit 13 and the feature information supplied from the converting unit 16.

For example, the determining unit 14 determines that the face image captured by the image capturing unit 15 is the face of the subject person when the positions of the facial features indicated by the feature information supplied from the converting unit 16 is within a range of the positions of the facial features indicated by the average position data and the movable range data. Otherwise, the determining unit 14 determines that the face image captured by the image capturing unit 15 is not the face of the subject person.

The determining unit 14 then supplies the determination result to the determination result outputting unit 17.

The determination result outputting unit 17 outputs the determination result to an external device in a predetermined format.

Figure 2:
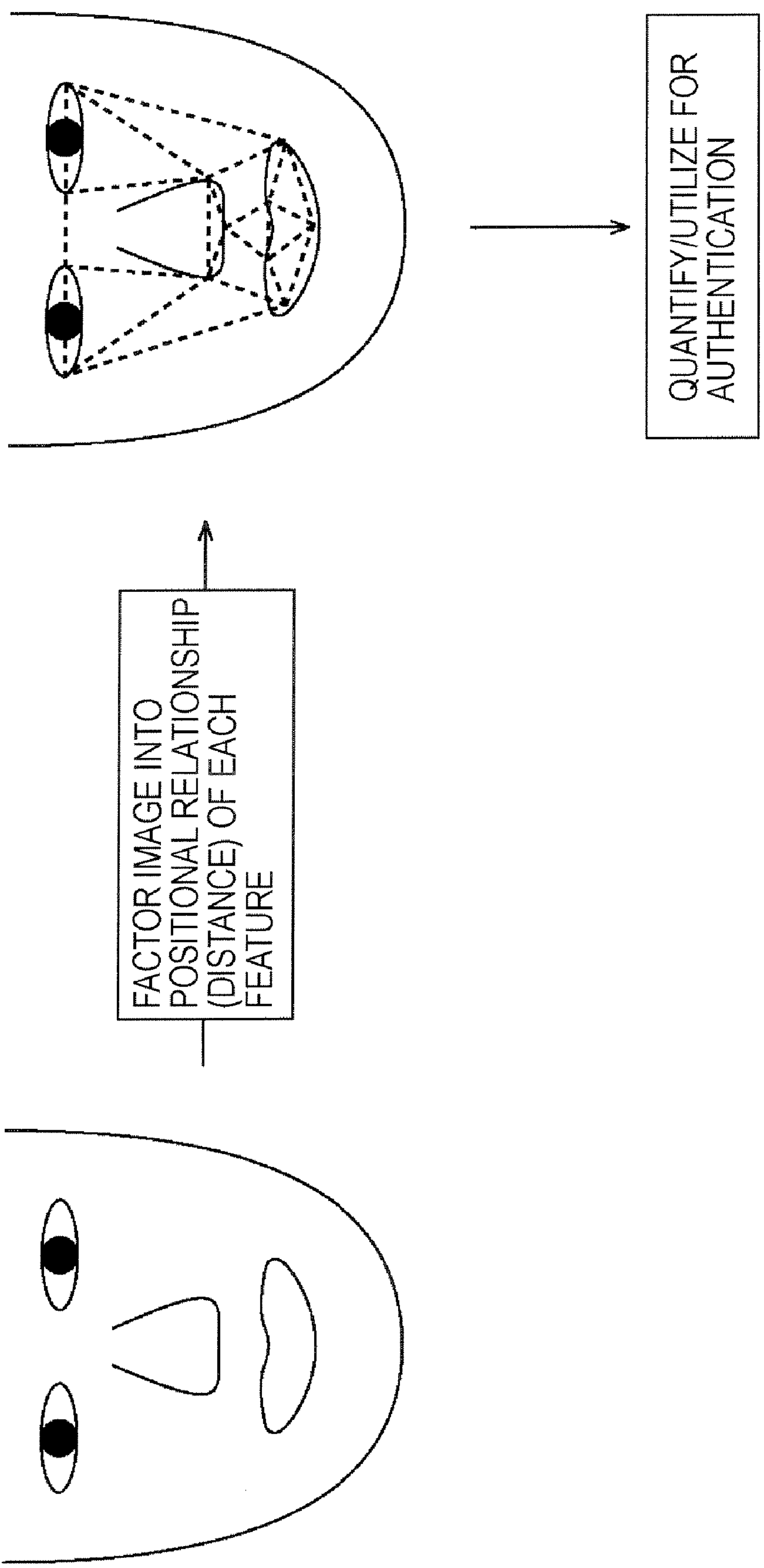
FIG. 2 shows an example of a human face image.

As shown in FIG. 2, for example, the image of a human face includes images of facial features, such as eyes, nose, and mouth, constituting a face. The image processing apparatus 1 authenticates the subject person on the basis of the positions of the facial features such as the shapes and arrangements of the facial features constituting a face. The image processing apparatus 1 factors the face image into positional relationships (e.g., distances) regarding the features, and quantifies the positional relationships. The image processing apparatus 1 then utilizes the quantified positional relationships for the authentication of the human face.

As shown in FIG. 3, as the facial expression changes, the positions or shapes of the eyes and mouth change. For example, on a smiling face, the positions of the eyes go up, whereas the position of the lower part of the mouth goes down. In addition, for example, on an angry face, the positions of the eyes go down, whereas the position of the lower part of the mouth and the positions of the corners of the mouth go up and down, respectively.

As shown in FIG. 4, changes in the positions or shapes of the mouth or eyes can be expressed by vectors. More specifically, on a smiling face, the positions of the corners of each eye and the position of the lower part of the mouth go up and down, respectively, relative to those of the eyes and mouth on an neutral face (i.e., an expressionless face). Thus, the change in the positions of the corners of each eye can be expressed by upward vectors, whereas the change in the position of the lower part of the mouth can be expressed by a downward vector.

On the other hand, on an angry face, the positions of the corners of each eye, of the lower part of the mouth, and of the corners of the mouth go down, up, and down, respectively, relative to those of the eyes and mouth on the neutral face. Thus, the change in the positions of the corners of each eye can be expressed by downward vectors, whereas the changes in the positions of the lower part and the corners of the mouth can be expressed by an upward vector and downward vectors, respectively.

The changes in the facial expressions are unique. That is, the facial expression changes uniquely for each person.

The facial features, such as eyes and mouth, on a face change in conjunction with each other depending on the bone structure or shapes of muscles of each person. Since the bone structure or the shapes of muscles differ for each person, the movable range of the facial features constituting the face also differs for each person when the facial expression changes. That is, the movable range of the facial features constituting the face is a characteristic of that person.

The image processing apparatus 1 finds the changes in the positions of the facial features constituting the face, which are unique to each person and occur as the facial expression changes. The image processing apparatus 1 authenticates whether or not the captured face image is the face image of the subject person on the basis of these changes.

Figure 5:
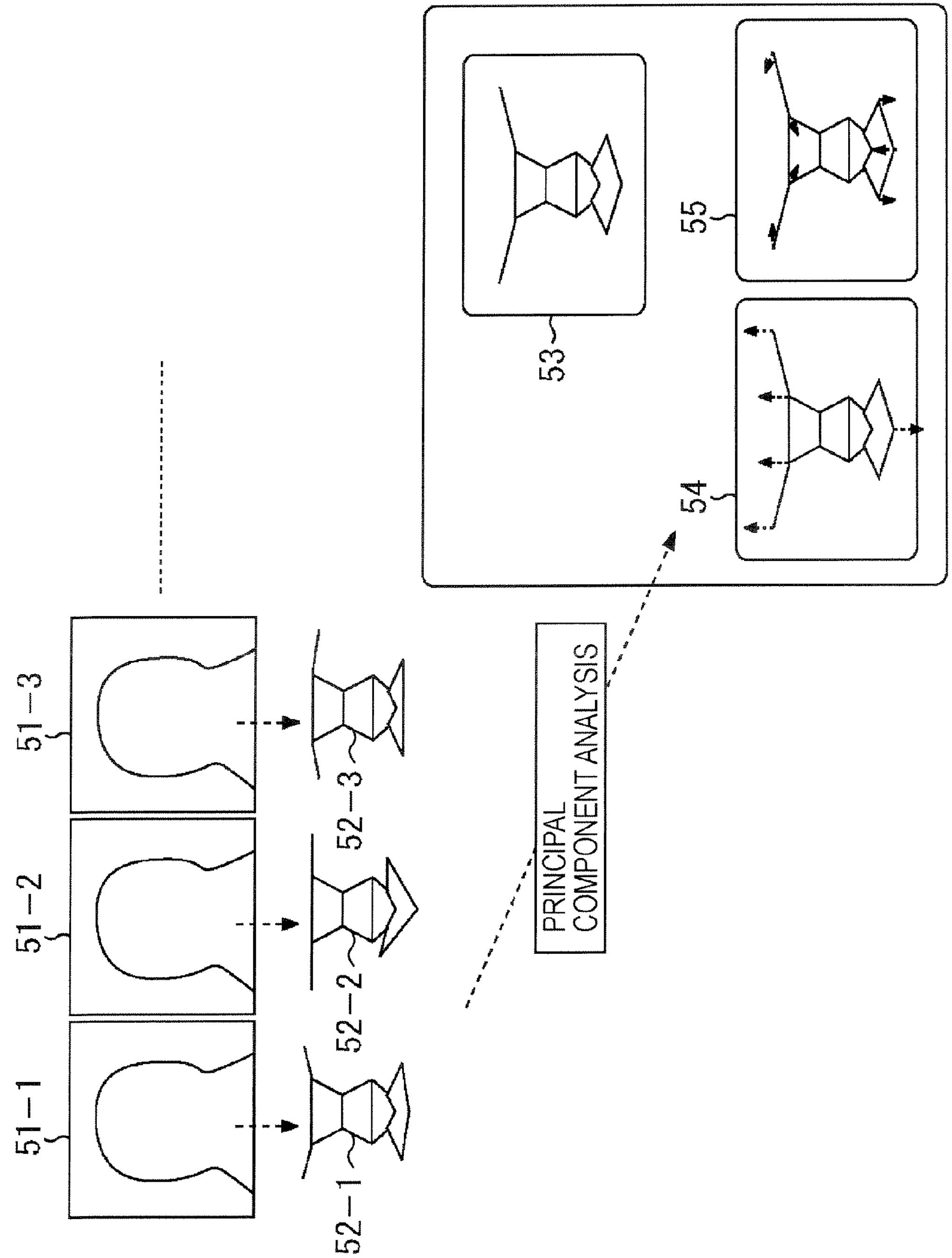
FIG. 5 illustrates an outline of processing performed by an image processing apparatus.

As shown in FIG. 5, the converting unit 11 of the image processing apparatus 1 finds, from the face images of the subject person with various facial expressions, the positions of the images of the facial features, such as eyes, nose, and mouth, in the face images. The converting unit 11 then generates a graph indicating positional relationships between the images of the facial features. For example, the converting unit 11 generates, from a face image 51-1 of the subject person, a graph 52-1 indicating the positional relationships between the images of the facial features, such as eyes, nose, and mouth, in the face image 51-1. Similarly, the converting unit 11 generates graphs 52-2 and 52-3 each indicating the positional relationships between the images of the eyes, nose, and mouth from face images 51-2 and 51-3 of the subject person, respectively. The facial expressions in the face images 51-2 and 51-3 differ from that in the face image 51-1.

The ends of each line constituting the graphs 52-1 to 52-3 indicate predetermined positions (e.g., left or right ends, or lower parts) of the facial features, such as eyes, nose, and mouth, in the face image.

The converting unit 11 normalizes the graphs 52-1 to 52-3 by correcting values of the coordinates of the graphs 52-1 to 52-3 or slopes relative to a barycenter.

The converting unit 11 supplies the graphs 52-1 to 52-3, i.e., the feature information, to the feature position/movable range calculating unit 12.

The feature position/movable range calculating unit 12 performs a principal component analysis on the normalized graphs 52-1 to 52-3 (more accurately, on the position information indicated by the graphs 52-1 to 52-3). Accordingly, the feature position/movable range calculating unit 12 calculates principal components indicating the neutral positions of the facial features and the change in the facial expression relative to the neutral positions. The neutral positions indicate the position of each facial feature on an expressionless face.

As described above, the feature position/movable range calculating unit 12 generates a graph 53 indicating the neutral positions and graphs 54 and 55 corresponding to the principal components indicating the facial expression change. For example, the ends of each line constituting the graph 53 indicate the neutral positions of the facial features, such as eyes, nose, and mouth, in the face image. In addition, for example, the graph 54 indicates a first principal component, whereas the graph 55 indicates a second principal component. Each line constituting the graph 54 or 55 has the same length as the corresponding line in the graph 53. Each vector disposed at the ends of the lines in the graph 54 or 55 indicates the first principal component or the second principal component.

Since the principal components having a low proportion may include more noise components, it is preferable to utilize only those having a proportion at or higher than a predetermined level.

The face and the facial expression change on the face, which are specific to the subject person, can be expressed using the graphs 53 to 55.

The graphs 53 to 55 are stored in, for example, the feature information storage unit 13.

Figure 6:
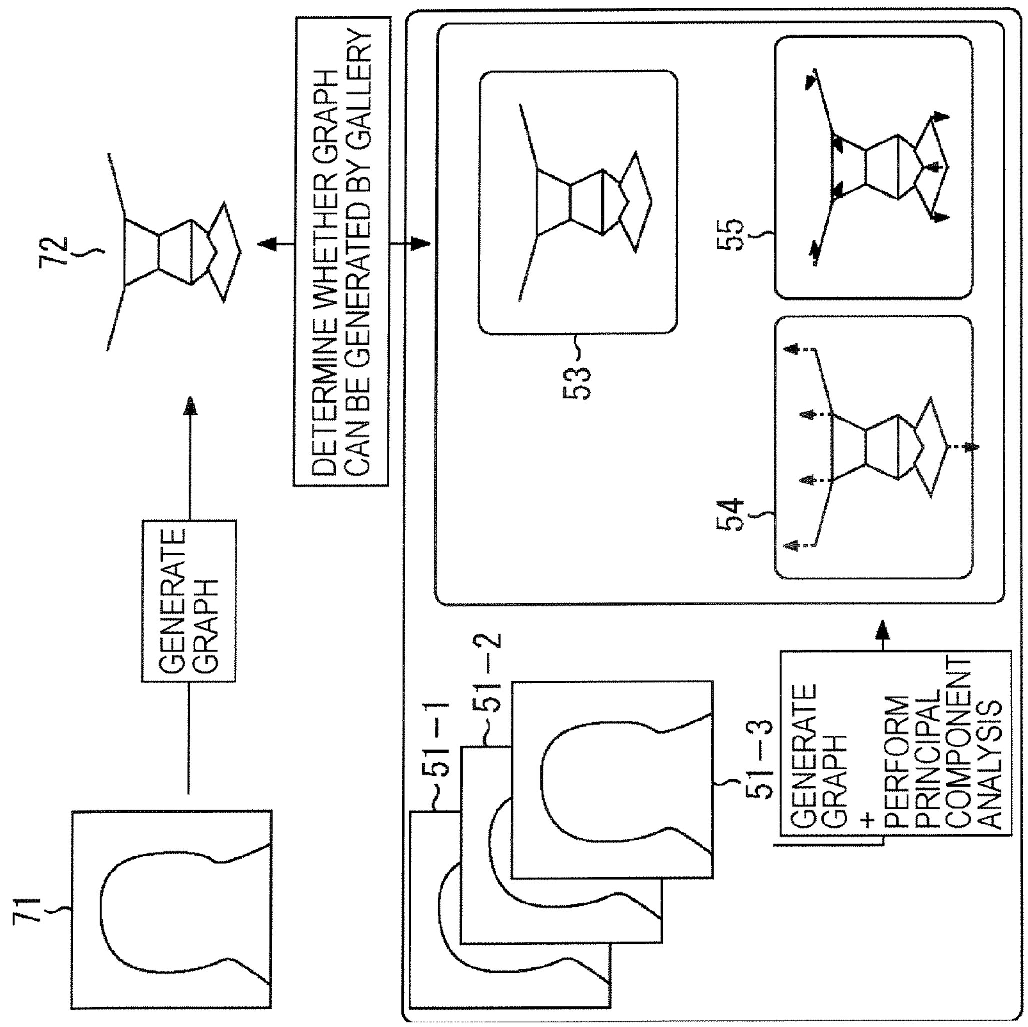
FIG. 6 illustrates an outline of processing performed by an image processing apparatus.

As shown in FIG. 6, the graphs 53 to 55 are utilized for the authentication. A set of the graphs 53 to 55 is referred to as a gallery, which includes the data indicating the characteristics of each person obtained by converting the face image into a graph and performing the principal component analysis. The characteristics of each person include the characteristics of each person's face and the characteristics of the facial expression change.

As shown in FIG. 6, the graphs 53 to 55 included in the gallery are obtained by converting the face images 51-1 to 51-3 of the subject person into graphs, and performing the principal component analysis on the obtained graphs 52-1 to 52-3. Additionally, it is preferable to select predetermined principal components, such as those having a proportion at or higher than the predetermined level, from those obtained by the principal component analysis so as to create the gallery.

The image capturing unit 15 captures a face image of a person to be authenticated, and supplies the face image 71 of the person to be authenticated to the converting unit 16. The converting unit 16 generates, from the face image 71 supplied from the image capturing unit 15, a graph 72 indicating the positional relationships between images of facial features, such as eyes, nose, and mouth, in the face image 71. Then, the converting unit 16 normalizes the graph 72 by correcting values of the coordinates of the graph 72 or slopes relative to the barycenter.

The converting unit 16 then supplies the normalized graph 72 to the determining unit 14.

The determining unit 14 reads out the graphs 53 to 55 from the feature information storage unit 13. The determining unit 14 determines whether or not the graph 72 can be expressed by the graphs 53 to 55, thereby determining whether or not the face image 71 captured by the image capturing unit 15 is the face image of the subject person. More specifically, when the graph 72 can be expressed by the graphs 53 to 55, the determining unit 14 determines that the face image 71 is the face image of the subject person. When the graph 72 is be expressed by the graphs 53 to 55, the determining unit 14 determines that the face image 71 is not the face image of the subject person.

That is, the determining unit 14 determines whether or not the face image 71 (or the graph 72) of the subject person to be authenticated can be expressed by the principal components of the facial expression change indicated by the graphs 53 to 55 included in the gallery.

For example, when the graph 72 is in a range indicated by the graphs 53 to 55, the determining unit 14 determines that the face image 71 is the face image of the subject person. When the graph 72 is out of the range indicated by the graphs 53 to 55, the determining unit 14 determines that the face image 71 is not the face image of the subject person.

The graphs 53 to 55 indicate the position and movable range of the facial features, which are unique to each person, and the relationships between the movements of the facial features. Thus, the determining unit 14 can accurately determine whether or not the face image 71 is the face image of the subject person, even if the facial expression on the captured face image 71 of the subject person differs.

Figure 7:
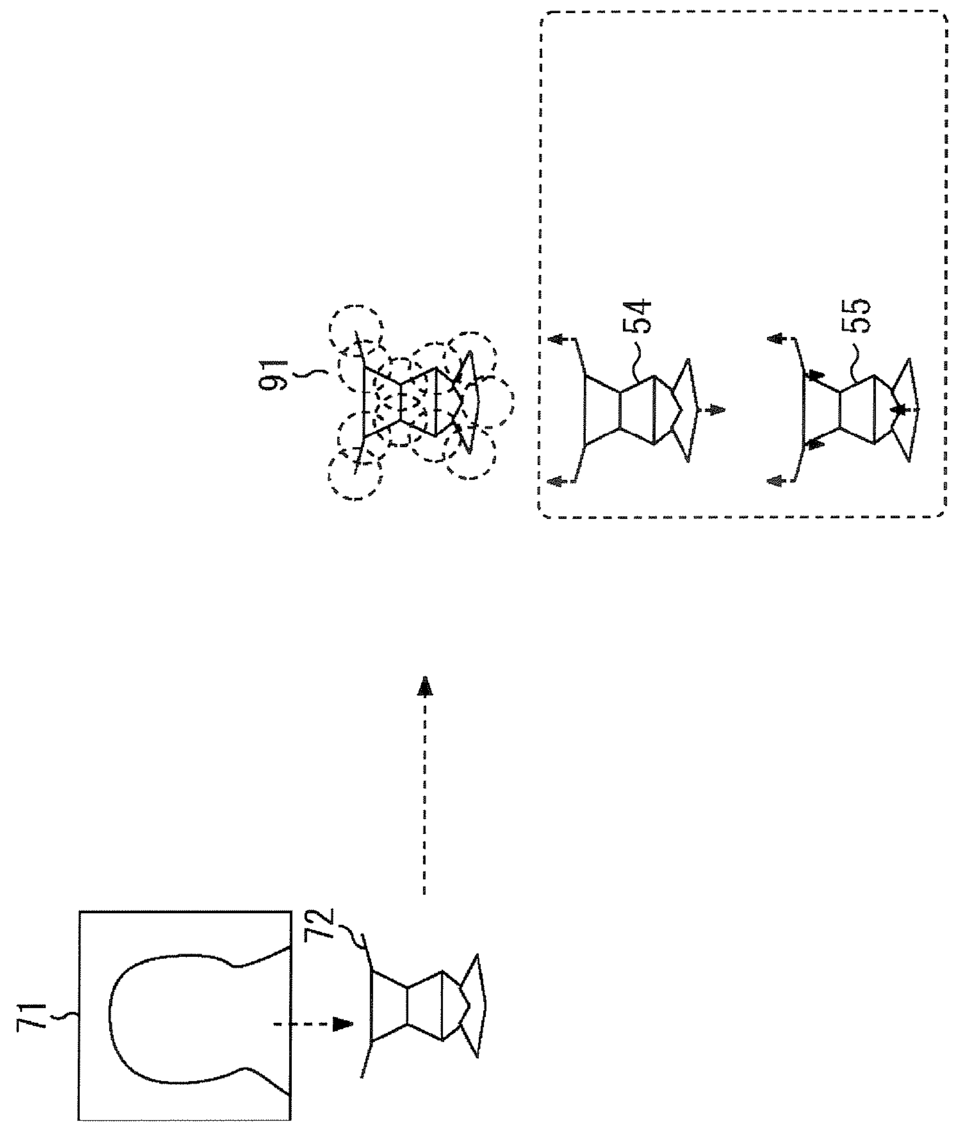
FIG. 7 illustrates a difference between a known technique and an embodiment of the present invention.

FIG. 7 illustrates a difference between a known technique and a technique adopted for use in the image processing apparatus 1. In the known technique, when the positions indicated by the graph 72 are within error ranges that are shown by a pre-registered graph 91 and are fixed relative to the positions of the facial features, such as eyes, nose, and mouth, the face image 71 is determined to be the face image of the subject person. In this case, if the face image 71 were to have a the different facial expression, then the face image 71 might be determined not to be the face image of the subject person, even if the face image 71 is obviously the face image of the subject person to human eyes.

On the other hand, since the graphs 54 and 55 indicate the change in the facial expression, which is unique to the subject person, the image processing apparatus 1 can obtain the linked movements of the facial features or the movable range of the subject person. Accordingly, even when the positions of the facial features in the face image 71 of the subject person differ from those shown in the graph 53, the face image 71 is determined to be the face image of the subject person more accurately.

Each of the graphs 54 and 55 may indicate the positions of the facial features of a predetermined facial expression. For example, the graph 54 may indicate the positions of the facial features on a smiling face, whereas the graph 55 may indicate the positions of the facial features on an angry face.

In addition, below, a description is given on, but not limited to, the change in the facial expression. The authentication of a subject person may be performed on images showing the subject person with a different hairstyle or with glasses.

Furthermore, the technique for extracting the change in the positions of the facial features is not limited to the principal component analysis. Other techniques, such as, for example, independent component analysis, can also be employed as long as values indicating the change in the image that occurs according to the facial expression change can be obtained.

Now, an embodiment of the present invention will be described more specifically.

FIG. 8 is a block diagram showing another configuration of an image processing apparatus 1 according to an embodiment of the present invention. The image processing apparatus 1 having the configuration shown in FIG. 8 includes a subject image storage unit 101, a feature detecting/feature coordinate normalizing unit 102, a principal component analyzing unit 103, a principal component selecting unit 104, an authentication target face image capturing unit 105, a feature detecting/feature coordinate normalizing unit 106, a similarity calculating unit 107, a threshold determining unit 108, a principal component direction threshold calculating unit 109, a principal component direction component calculating unit 110, a range determining unit 111, and a result outputting unit 112.

The subject image storage unit 101 includes a recording medium or a storage medium such as a hard disk drive, an optical disc and an optical disc drive, or a semiconductor memory. The subject image storage unit 101 stores face images of a subject person with different facial expressions. Hereinafter, the face images stored in the subject image storage unit 101 are referred to as "registered face images".

The feature detecting/feature coordinate normalizing unit 102 reads out the registered face image from the subject image storage unit 101, and detects positions of facial features (or images of facial features), such as eyes, nose, and mouth, from each of the read-out registered face images. The feature detecting/feature coordinate normalizing unit 102 then normalizes the positions of the facial features, such as eyes, nose, mouth, in the registered face images by translating the position of each facial feature upward, downward, to the right, and to the left, by rotating the position of the facial features, or changing the size of the registered face image.

The feature detecting/feature coordinate normalizing unit 102 supplies information indicating the positions of the facial features to the principal component analyzing unit 103, the threshold determining unit 108, a principal component direction threshold calculating unit 109, and the principal component direction component calculating unit 110. The information supplied here is normalized with respect to predetermined coordinates, and hereinafter is referred to as "registered position information".

The principal component analyzing unit 103 performs principal component analysis on the coordinates of the facial features indicated by the registered position information supplied from the feature detecting/feature coordinate normalizing unit 102. The principal component analyzing unit 103 supplies information on each principal component obtained by the principal component analysis performed on the coordinates of the facial features to the principal component selecting unit 104.

The principal component selecting unit 104 cumulatively adds a proportion of each principal component supplied by the principal component analyzing unit 103 in a descending order of the proportion magnitude to calculate a cumulative proportion of each principal component. The principal component selecting unit 104 compares the cumulative proportion with a predetermined threshold, and selects the principal components. More specifically, the selecting unit 104 selects the principal components in the above-mentioned descending order from that having the greatest cumulative proportion to that having the cumulative proportion first exceeding the threshold.

The principal component selecting unit 104 supplies a predetermined number of selected principal components to the similarity calculating unit 107, the principal component direction threshold calculating unit 109, and the principal component direction component calculating unit 110.

The authentication target face image capturing unit 105 includes a digital still camera or a digital video camera, and captures a face of a subject person to be authenticated. The authentication target face image capturing unit 105 supplies the captured face image of the person (hereinafter, referred to as "authentication target face image") to the feature detecting/feature coordinate normalizing unit 106.

The feature detecting/feature coordinate normalizing unit 106 has the same configuration as the feature detecting/feature coordinate normalizing unit 102. The feature detecting/feature coordinate normalizing unit 106 detects positions of facial features, such as eyes, nose, and mouth, from the authentication target face image. The feature detecting/feature coordinate normalizing unit 106 then normalizes the positions of the facial features, such as eyes, nose, and mouth, in the authentication target face images by translating the position of each facial feature upward, downward, to the right, and to the left, by rotating the position of the facial features, or changing the size of the face image.

The feature detecting/feature coordinate normalizing unit 102 may be configured to detect the positions of the facial features, such as eyes, nose, and mouth, from the authentication target face image. Additionally, the feature detecting/feature coordinate normalizing unit 106 may be configured to detect the positions of the facial features, such as eyes, nose, and mouth, from the registered face image. That is, either the feature detecting/feature coordinate normalizing unit 102 or 106 may detect the positions of the facial features, such as eyes, nose, and mouth, from the authentication target face image and the registered face image.

In addition, the feature detecting/feature coordinate normalizing unit 102 or 106 may extract a part having an image of a face from the authentication target face image or the registered face image, and may detect the positions of the facial features, such as eyes, nose, and mouth, from the extracted part of the image.

The feature detecting/feature coordinate normalizing unit 106 supplies the information indicating the position of the facial features to the similarity calculating unit 107 and the principal component direction component calculating unit 110. The information supplied here is normalized with respect to predetermined coordinates, and hereinafter is referred to as "authentication target position information".

The similarity calculating unit 107 calculates an evaluation value from the authentication target position information supplied from the feature detecting/feature coordinate normalizing unit 106 and the predetermined number of selected principal components supplied from the principal component selecting unit 104. The evaluation value calculated by the similarity calculating unit 107 indicates the degree of similarity between the authentication target face image and the registered face images.

That is, the similarity calculating unit 107 calculates the evaluation value, which is used to evaluate the positions of the facial features in the authentication target face image relative to the principal components resulting from the principal component analysis, from the positions of the facial features in the authentication target face image, i.e., the face image to be authenticated.

For example, the similarity calculating unit 107 calculates the evaluation value indicating the distances between the principal components and the positions of the facial features in the authentication target face image from the positions of the facial features in the authentication target face image and the principal components.

Alternatively, the similarity calculating unit 107 may calculate the evaluation value from the positions of the facial features in the authentication target face image and the registered face images according to the principal components.

The similarity calculating unit 107 supplies the evaluation value to the threshold determining unit 108.

The threshold determining unit 108 compares the evaluation value with a threshold so as to determine whether or not the face in the authentication target face image matches the face in the registered face images. More specifically, the threshold determining unit 108 sets the threshold on the basis of the positions of the facial features in the registered face images and the principal components, and compares the calculated evaluation value with this threshold. Accordingly, the threshold determining unit 108 determines whether or not the face in the authentication target face image matches the face in the registered face images.

The threshold determining unit 108 supplies the determination result to the result outputting unit 112.

The principal component direction threshold calculating unit 109 calculates a threshold on the basis of the positions of the facial features in the registered face images relative to the principal components. The threshold is in a direction orthogonal to the direction of the threshold used for the determination performed by the threshold determining unit 108.

More specifically, the feature detecting/feature coordinate normalizing unit 102 supplies the registered position information, which indicates the normalized position of the facial features in the registered face image, to the principal component direction threshold calculating unit 109. The principal component selecting unit 104 supplies the predetermined number of selected principal components. The principal component direction threshold calculating unit 109 calculates thresholds, i.e., a maximum value and a minimum value of the positions of facial features in the registered face images in the direction of each principal component from the registered position information and the principal components. Hereinafter, the maximum and minimum values are referred to as a "maximum threshold" and a "minimum threshold", respectively.

The principal component direction threshold calculating unit 109 supplies the maximum and minimum thresholds for each principal component to the range determining unit 111.

The principal component direction component calculating unit 110 calculates the evaluation value, which is compared with the thresholds calculated by the principal component direction threshold calculating unit 109. The evaluation value is used to evaluate the position of the facial features in the authentication target face image relative to the principal components, and is orthogonal to the threshold calculated by the similarity calculating unit 107.

More specifically, the feature detecting/feature coordinate normalizing unit 102 supplies the registered position information, which indicates the normalized position of the facial features in the registered face image, to the principal component direction component calculating unit 110. The feature detecting/feature coordinate normalizing unit 106 supplies the authentication target position information, which indicates the normalized position of the facial features in the authentication target face image, to the principal component direction component calculating unit 110. The principal component direction component calculating unit 110 finds a difference vector on the basis of the registered position information and the authentication target position information. The difference vector is a result of subtracting a vector indicating a mean value of the positions of the facial features in the registered face images from a vector indicating the positions of the facial features in the authentication target face image. In addition, the principal component direction component calculating unit 110 finds an inner product of a principal component vector, which indicates each principal component, and the difference vector regarding the predetermined number of selected principal components supplied from the principal component selecting unit 104. The principal component direction component calculating unit 110 supplies the inner product of each principal component vector and the difference vector to the range determining unit 111 as the evaluation value.

The range determining unit 111 determines whether or not the inner product of each principal component vector and the difference vector supplied from the principal component direction component calculating unit 110 is within a range indicated by the maximum threshold and the minimum threshold for each principal component supplied from the principal component direction threshold calculating unit 109. More specifically, the range determining unit 111 determines that the face in the authentication target face image matches the face in the registered face images if the inner product, i.e., the evaluation value, of the each principal component vector and the difference vector is within the range indicated by the maximum and minimum thresholds of the corresponding principal component. If the inner product is not within the range, the range determining unit 111 determines that the face in the authentication target face image differs from the face in the registered face images. The range determining unit 111 supplies the determination result to the result outputting unit 112.

The result outputting unit 112 finally determines the face in the authentication target face image matches the face in the registered face images and output the result, only when both the threshold determining unit 108 and the range determining unit 111 determine that the face in the authentication target face image matches the face in the registered face images. That is, the result outputting unit 112 outputs the result indicating the target person is the subject person. On the other hand, the result outputting unit 112 finally determines the face in the authentication target face image differs from the face in the registered face images and output the result, when either the threshold determining unit 108 or the range determining unit 111 determine that the face in the authentication target face image differs from the face in the registered face images. That is, the result outputting unit 112 outputs the result indicating the target person differs from the subject person.

The registered position information, the principal components selected by the principal component selecting unit 104, the threshold used for the determination performed by the threshold determining unit 108 and set on the basis of the position of the facial features in the registered face images and the principal component, or the maximum and minimum thresholds of each principal component may be calculated in advance and recorded on a recording medium or the like. In such a case, the authentication of the authentication target face image can be performed by reading out the information and performing the above-described processing.

Referring to a flowchart shown in FIG. 9, authentication processing performed by the image processing apparatus 1 will be described next. At STEP S11, the feature detecting/feature coordinate normalizing unit 102 loads the registered face images, which are the prestored face images of the subject person, from the subject image storage unit 101. Here, the feature detecting/feature coordinate normalizing unit 102 loads the registered face images of the subject person with different facial expressions.

At STEP S12, the feature detecting/feature coordinate normalizing unit 102 detects the facial features of the subject person from the registered face images. More specifically, as shown in FIG. 10, the feature detecting/feature coordinate normalizing unit 102 detects the positions of the facial features, such as eyes, nose, and mouth, from the registered images at STEP S12.

Figure 11C:
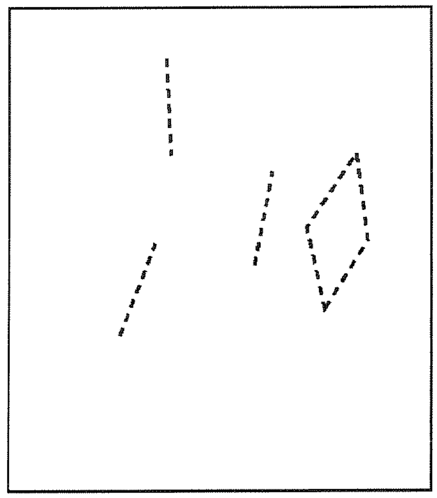
FIGS. 11A to 11C illustrate examples of detecting positions of facial features such as eyes, nose, and mouth.
Figure 11B:
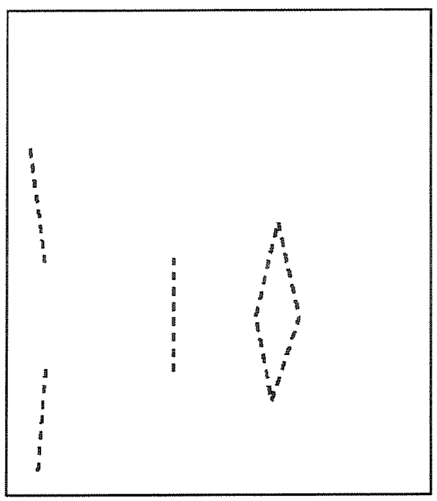
Figure 11A:
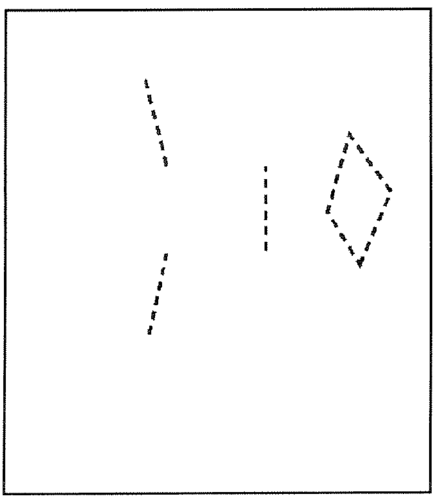

Since the subject image storage unit 101 stores the face images of the subject person with different facial expressions as the registered face images, the feature detecting/feature coordinate normalizing unit 102 detects the positions of the images of the facial features, such as eyes, nose, and mouth, in each registered face image as shown in FIGS. 11A to 11C. For example, the feature detecting/feature coordinate normalizing unit 102 identifies the positions of the both corners of each eyes, the positions of the left and right ends of the nose, the positions of the both corners of the mouth, and the positions of the upper and lower parts of the mouth.

Figure 12C:
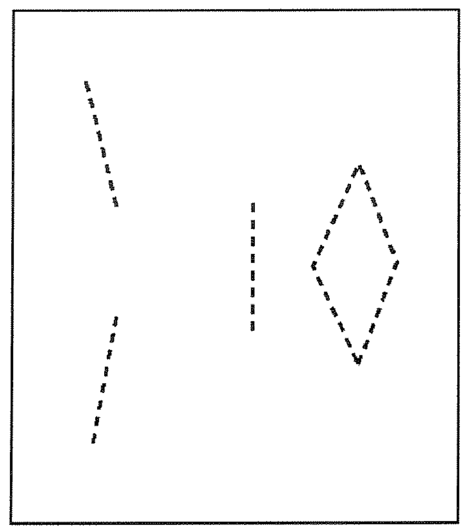
FIGS. 12A to 12C illustrate examples of normalization.
Figure 12B:
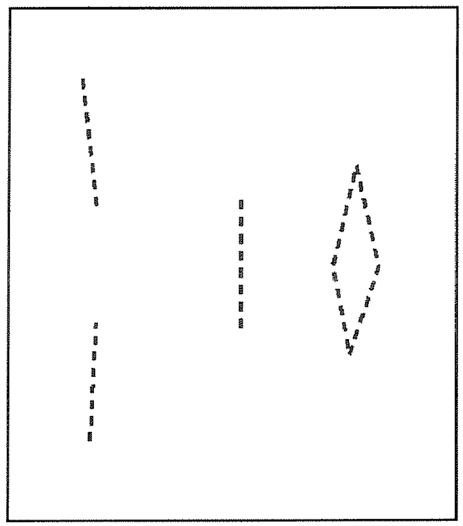
Figure 12A:
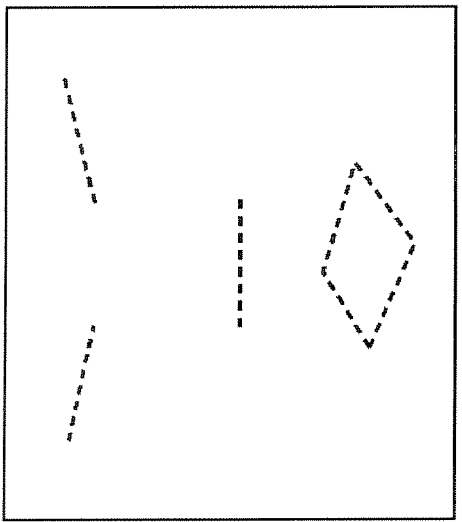

At STEP S13, the feature detecting/feature coordinate normalizing unit 102 normalizes the coordinates indicating the positions of facial features such as eyes, nose, and mouth. For example, as shown in FIGS. 12A to 12C, the feature detecting/feature coordinate normalizing unit 102 translates the positions of each facial feature upward, downward, to the left, and to the right, rotates the face image regarding the barycenter, or performs scaling of the face images (changes the size of the face image) while maintaining the distance between the facial features. Accordingly, the feature detecting/feature coordinate normalizing unit 102 normalizes the positions of the facial features, such as eyes, nose, and mouth, in the registered face images.

Figure 13C:
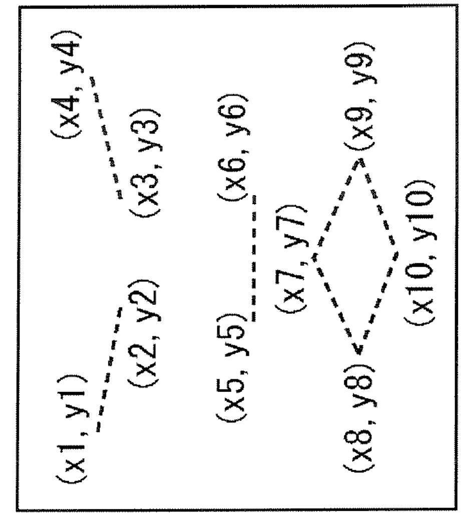
FIGS. 13A to 13C illustrate examples of obtaining coordinate positions of facial features such as eyes, nose, and mouth.
Figure 13B:
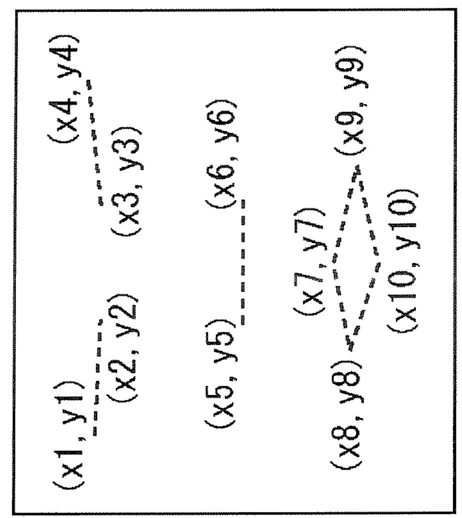
Figure 13A:
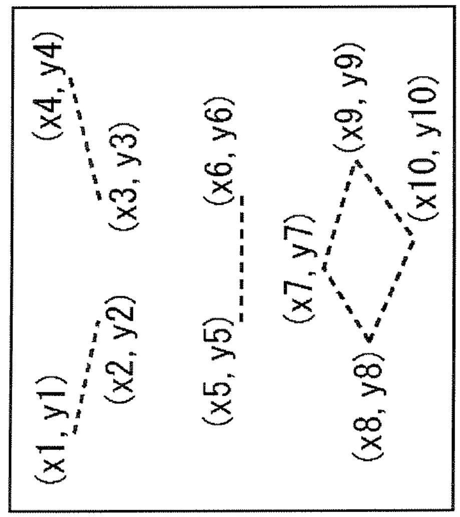

For example, as shown in FIGS. 13A to 13C, the feature detecting/feature coordinate normalizing unit 102 obtains the normalized positions of the facial features, such as eyes, nose, and mouth, on the coordinate space (hereinafter, referred to as "coordinate position").

Here, the coordinate position of each facial feature can be expressed as $(x_1, y_1), (x_2, y_2), (x_3, y_3), \ldots, (x_n, y_n)$, where "n" represents the number of facial features (the number of positions of the facial features) to be obtained. The registered face image can be expressed by 2n-dimensional feature position vector $x^T$ by reciting these coordinates. The feature position vector $x^T$ is expressed by equation (1).

$$X^T=(x_1,y_1,x_2,y_2 \ldots x_n,y_n) \tag{1}$$

For example, at STEP S13, the feature detecting/feature coordinate normalizing unit 102 obtains the coordinates positions indicating the positions of both corners of both eyes, the positions of the left and right ends of the nose, the positions of both corners of the mouth, and the positions of the upper and lower parts of the mouth from each registered face image.

More specifically, as shown in FIGS. 13A to 13C, for example, feature detecting/feature coordinate normalizing unit 102 obtains the coordinates (x1, y1), (x2, y2), (x3, y3), and (x4, y4) indicating the positions of both corners of both eyes, the coordinates (x5, y5) and (x6, y6) indicating the positions of the left and right ends of the nose, the coordinates (x7, y7) indicating the position of the upper part of the mouth, the coordinates (x8, y8) and (x9, y9) indicating the positions of both corners of the mouth, and the coordinates (x10, y10) indicating the position of the lower part of the mouth.

In this case, the feature position vector $x^T$ can be expressed as (x1, y1, x2, y2, x3, y3, x4, y4, x5, y5, x6, y6, x7, y7, x8, y8, x9, y9, x10, y10).

The feature detecting/feature coordinate normalizing unit 102 supplies the feature position vector $x^T$ to the principal component analyzing unit 103 as the registered position information.

At STEP S14, the principal component analyzing unit 103 performs the principal component analysis operation on the coordinate positions of the facial features, such as eyes, nose, and mouth, in the registered face image. At STEP S15, the principal component selecting unit 104 selects a predetermined number of principal components having greater proportion.

When the principal component analysis operation is performed on the feature position vectors $x^T_i$ ($0 \leqq i < k$) obtained from each of k registered face images to be used as the comparison target in the authentication, 2n-dimensional principal component vectors $a_i$ ($0 \leqq i \leqq k$) are obtained. The principal component vectors $a_i$ are unit vectors and orthogonal to each other.

The principal component analysis allows the principal components to be decreased to the significant principal components (i.e., the principal component vectors $a_i$) using a cumulative proportion. More specifically, the cumulative proportion is determined by cumulatively adding the proportion of each principal component in the descending order of the proportion.

The predetermined threshold and the cumulative proportion is compared and the principal components from that having the greatest proportion to that having the proportion first exceeding the threshold are selected, thereby decreasing the number of principal components from k to L.

For example, at STEP S15, the principal component selecting unit 104 selects L principal components having greater proportion, thereby decreasing the number of principal components from k to L (L<k).

A description below is given using L principal component vectors $a_i$ ($0 \leqq i < L$) while taking a case in which L principal components are selected as an example.

At STEP S16, the feature detecting/feature coordinate normalizing unit 106 loads the authentication target face image, which is a face image to be authenticated, from the authentication target face image capturing unit 105.

At STEP S17, the feature detecting/feature coordinate normalizing unit 106 performs the same operation as that performed at STEP S12 to detect the facial features from the authentication target face image. At STEP S18, the feature detecting/feature coordinate normalizing unit 106 performs the same operation as that performed at STEP S13 to normalize the coordinates positions indicating the positions of the facial features, such as eyes, nose, and mouth, in the authentication target face image.

At STEP S19, the similarity calculating unit 107 calculates the evaluation value that is used to evaluate the similarity to the principal component vector.

Now, calculation of the evaluation value will be described more specifically below.

A feature position vector $y^T$ indicating the coordinate positions of the facial features, such as eyes, nose, and mouth, in the authentication target face image can be expressed in the same manner as the feature position vector $x^T$.

Firstly, a mean vector of the feature position vectors $x^T$ of k registered face images can be expressed by equation (2).

$$\bar{x} = \frac{1}{k} \sum_{0 \leq i < k} x_i \tag{2}$$

The difference between the feature position vector $y^T$ and the average feature position in the subject person's face is expressed using a difference vector d. The difference vector d is expressed by equation (3).

$$d = y - \bar{x} \tag{3}$$

If the feature position vector $y^T$ is generated from the face image of the subject person, the difference vector d should be certainly expressed using the principal component vectors $a_i$ ($0 \leqq i < L$).

Accordingly, the evaluation value s can be calculated by introducing a discriminant function expressed by equation (4).

$$s = \sqrt{|d|^2 - \sum_{0 \leq i < L} (d \cdot a_i)^2} \tag{4}$$

The evaluation value s indicates a distance between a space defined by the principal component vectors $a_i$ ($0 \leqq i < L$) and the difference vector d. Comparison of the evaluation value and a predetermined threshold allows the authentication target face image to be determined as the face image of the subject person.

For example, at STEP S19, the similarity calculating unit 107 calculates the evaluation value s expressed by equation (4).

At STEP S20, the threshold determining unit 108 determines whether or not the similarity of the authentication target face image exceeds the threshold. More specifically, at STEP S20, the threshold determining unit 108 determines whether or not the face in the authentication target face image matches the face in the registered face images by comparing the evaluation value calculated at STEP S19 with the threshold.

For example, the threshold determining unit 108 determines, using equation (5), whether or not the face in the authentication target face image matches the face in the registered face images on the basis of whether or not equation (5) is satisfied. More specifically, when equation (5) is satisfied, the threshold determining unit 108 determines that the face in the authentication target face image matches the face in the registered face images. When equation (5) is not satisfied, the threshold determining unit 108 determines that the face in the authentication target face image differs from the face in the registered face images.

$$s < \max_{0 \leq j < k} \sqrt{|x_j - \bar{x}|^2 - \sum_{0 \leq i < L} \{(x_j - \bar{x}) \cdot a_i\}^2} \tag{5}$$

The threshold determining unit 108 calculates the threshold indicated by the right hand side of equation (5) from the feature position vectors $x^T_i$ ($0 \leqq i < k$) of each of k registered face images, the mean vector of the feature position vectors $x^T$, and selected principal component vectors $a_i$ ($0 \leqq i < L$). The threshold determining unit 108 then performs the determination using equation (5).

More specifically, the threshold determining unit 108 determines that the face in the target image matches the face in the registered image, when the evaluation value is lower than the threshold. The threshold is a maximum value among square roots of results of subtracting a sum of squares of inner products of the difference vector and each principal component vector $a_i$ ($0 \leqq i < L$) from a square of a magnitude of the difference vector. The difference vector indicates the difference between the feature position vector $x^T_i$ ($0 \leqq i < k$), indicating the positions of the facial features in each registered image, and the mean vector, indicating the mean value of the positions of the facial features in the registered image.

Figure 14:
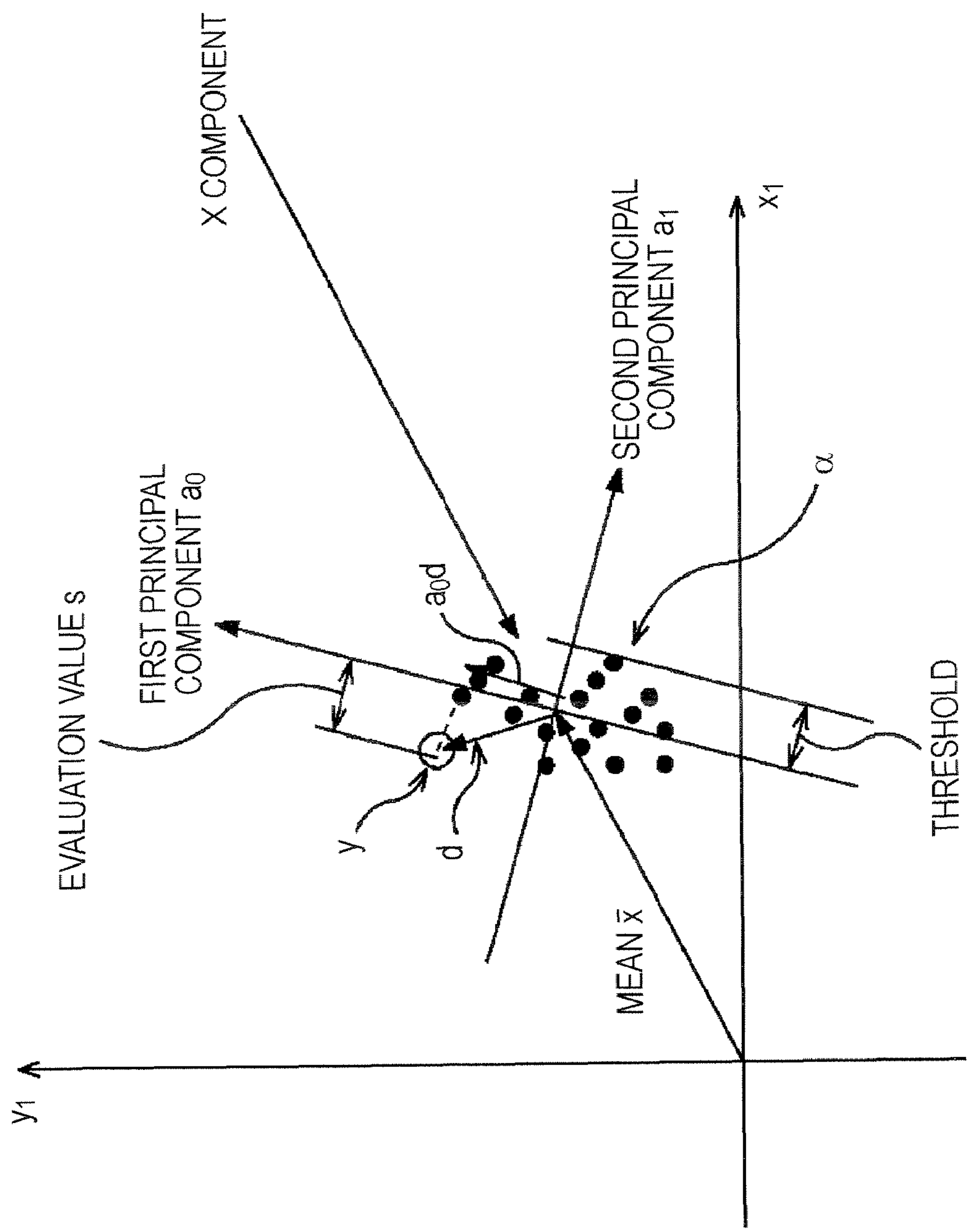
FIG. 14 illustrates determination processing.

FIG. 14 illustrates the determination processing performed on, for example, 2-dimensional principal component at STEP S20. Black dots in FIG. 14 corresponds to the positions indicated by the feature position vectors $x^T$ that indicate the coordinate positions of the facial features, such as eyes, nose, and mouth, in the registered face images. A white dot in FIG. 14 corresponds to the position indicated by the feature position vector $y^T$ that indicates the coordinate position of the facial features, such as eyes, nose, and mouth, in the authentication target face image.

In a case shown in FIG. 14, the evaluation value s expressed by equation (4) indicates the distance between the position indicated by the feature position vector $y^T$ and a first principal component $a_0$. The position indicated by the feature position vector $y^T$ is expressed by the difference vector d in a space defined by the first principal component $a_0$ and a second principal component $a_1$. Thus, the evaluation value s expressed by equation (4) indicates the distance from the position indicated by the feature position vector $y^T$ to a first principal component $a_0$.

The threshold indicated by the right hand side of equation (5) corresponds to a minimum evaluation value s among those obtained by applying equation (4) on each feature position vector $x^T$ of a plurality of registered face images while assuming the feature position vector $x^T$ as the feature position vector $y_T$.

That is, the threshold indicated by the right hand side of equation (5) corresponds to the farthest position (i.e., the position shown by $\alpha$ in FIG. 14) from the first principal component $a_0$ among those indicated by the feature position vectors $x^T$.

In the determination performed at STEP S20, whether or not the position indicated by the feature position vector $y^T$ is closer to the first principal component $a_0$ than the position farthest from the first principal component $a_0$ of the positions indicated by the feature position vectors $x^T$ is determined.

At STEP S20, if the similarity of the authentication target face image is determined to exceed the threshold, that is, if the face in the authentication target face image is determined to be the face in the registered face images, the process proceeds to STEP S21. At STEP S21, the principal component direction threshold calculating unit 109 calculates a threshold of the position indicated by the feature position vector $x^T$ of each principal component from the registered face images of the subject person. The threshold indicates a range in a direction of the principal component. More specifically, at STEP S21, the principal component direction threshold calculating unit 109 calculates the maximum and minimum thresholds of the positions of the facial features in the registered face images in the direction of each principal component.

At STEP S22, the principal component direction component calculating unit 110 evaluates the magnitude of the component in the authentication target face image in each principal component direction. That is, at STEP S22, the principal component direction component calculating unit 110 determines an inner product of the difference vector and the principal component vector $a_i$ as the evaluation value. The difference vector results from subtracting the vector indicating the mean value of positions of each facial feature in the registered face images from the feature position vector $y^T$ indicating the positions of the facial features in the authentication target face image.

At STEP S23, the range determining unit 111 determines whether or not all of the components are within the ranges.

More specifically, at STEP S21, the thresholds indicated by the right and left hand sides of inequality (6) are calculated. At STEP S22, the evaluation value indicated by the middle part of inequality (6) is calculated. At STEP S23, whether or not inequality (6) is satisfied is determined.

$$\min_{0\leq j<k}\{(x_j-\bar{x})\cdot a_i\}\leq d\cdot a_i\leq \max_{0\leq j<k}\{(x_j-\bar{x})\cdot a_i\} \tag{6}$$

The right hand side of inequality (6) indicates the maximum threshold of the positions of the facial features in the registered images (i.e., the position indicated by the feature position vector $x^T$) in a predetermined principal component direction. In addition, the left hand side of inequality (6) indicates the minimum threshold of the positions of the facial features in the registered images (i.e., the position indicated by the feature position vector $x^T$) in a predetermined principal component direction.

The middle part of inequality (6) indicates the position of the facial features (i.e., the position indicated by the feature position vector $y^T$) in the authentication target face image in a predetermined principal component.

Figure 15:
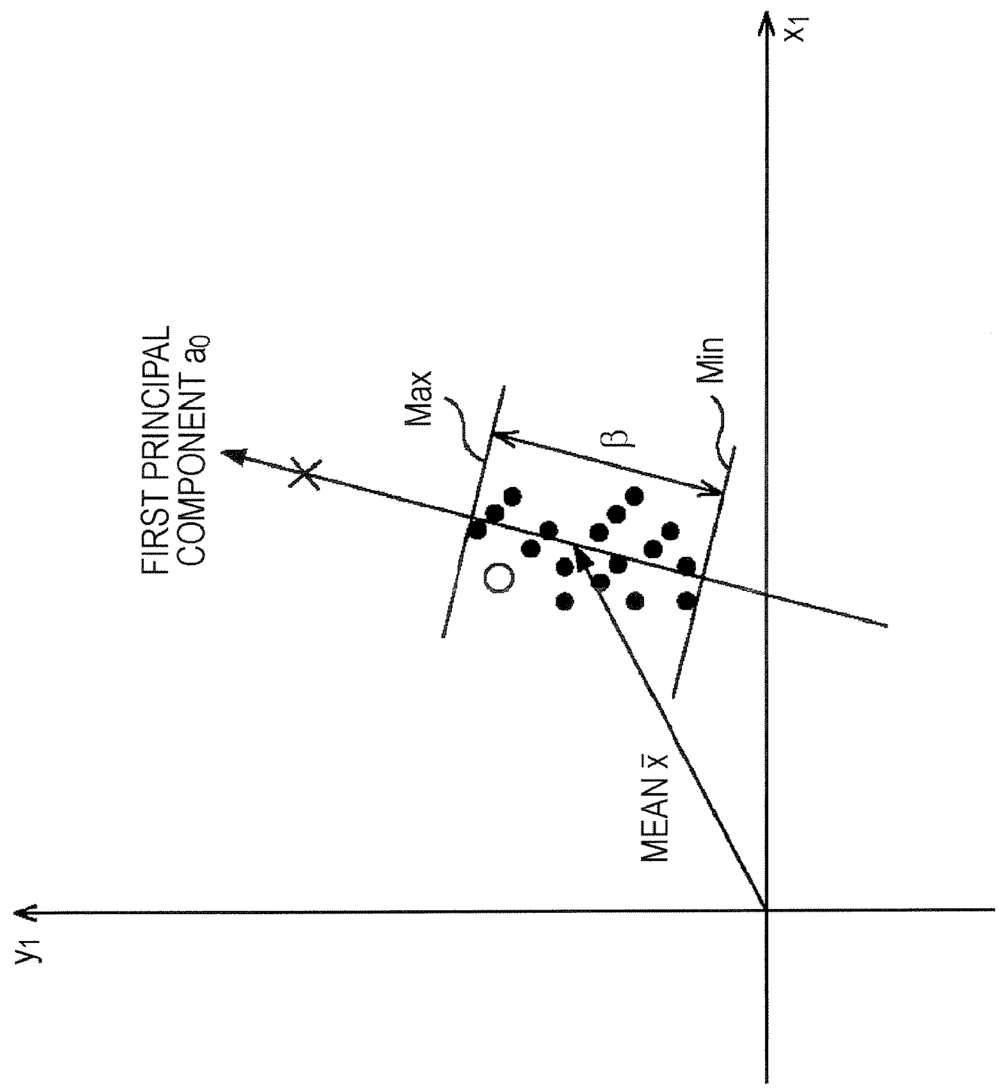
FIG. 15 illustrates determination processing.

For example, as shown in FIG. 15, the right hand side of inequality (6) indicates the maximum threshold (i.e., the value shown by Max in FIG. 15) of the positions of the facial features in the registered face images (i.e., the position indicated by the feature position vector $x^T$) in the direction of the first principal component $a_0$ (i.e., the predetermined principal component). In addition, the left hand side of inequality (6) indicates the minimum threshold (i.e., the value shown by Min in FIG. 15) of the positions of the facial features in the registered images (i.e., the position indicated by the feature position vector $x^T$) in the direction of the first principal component $a_0$ (i.e., the predetermined principal component).

In this case, the evaluation value (i.e., the middle part of inequality (6)) indicates the positions of the facial features (i.e., the position indicated by the feature position vector $y^T$) in the authentication target face image in the direction of the first principal component $a_0$ (i.e., the predetermined principal component).

At STEP S23, whether or not the evaluation value is between two thresholds is determined. More specifically, whether or not the position indicated by the feature position vector $y^T$ is between the maximum value and the minimum value of the position indicated by the feature position vector $x^T$ is determined regarding the direction of each of the principal components.

For example, suppose the position indicated by the feature position vector $y^T$ indicating the coordinate position of the facial features, such as eyes, nose, and mouth, in the authentication target face image is shown by a white dot in FIG. 15. When the white dot is between Max and Min in FIG. 15 regarding the first principal component $a_0$, the target person is determined as the subject person. On the other hand, for example, suppose the position indicated by the feature position vector $y^T$ is shown by a mark "x" in FIG. 15. When the mark "x" is not between Max and Min in FIG. 15 regarding the first principal component $a_0$, the target person is determined not to be the subject person, that is, the target person is determined to be other person.

As described above, at STEP S21, the threshold is calculated regarding each of the principal components. At STEP S22, the evaluation value is calculated regarding each of the principal components. Additionally, at STEP S23, whether or not the evaluation value is within the range indicated by the thresholds are determined regarding all of the principal components. If all of the evaluation values are determined to be within the range, the target person is determined to be the subject person. If at least one of the evaluation values is determined to be out of the range, the target person is determined not to be the subject person.

The above configuration can improve the accuracy of the authentication of whether or not the target face is the face of the subject person.

At STEP S23, if all of the components are determined to be within the range, the process proceeds to STEP S24. At STEP S24, the result outputting unit 112 outputs the determination result indicating the target person is the subject person, and the process ends.

At STEP S23, if at least one of the principal components is determined to be out of the range, the process proceeds to STEP S25. At STEP S25, the result outputting unit 112 outputs the determination result indicating the target person is not the subject person, and the process ends.

In addition, if the face in the authentication target face image is determined not to be the face in the registered face images at STEP S20, the process proceeds to STEP S25. At STEP S25, the result outputting unit 112 outputs the determination result indicating the target person is not the subject person, and the process ends.

Instead of the evaluation value s expressed by equation (4), equation (7) may be used as the evaluation value.

$$s = \frac{\sum_{0 \le i < L} (d \cdot a_i)^2}{|d|} \tag{7}$$

The evaluation value of equation (7) indicates a ratio of a magnitude of a vector, which is the difference vector d expressed by equation (3) projected on a space defined by the principal component vectors $a_i$ (0≦I<L), to the magnitude of the difference vector d.

In this case, whether or not the face in the authentication target face image matches the face in the registered face image is determined on the basis of whether or not equation (8) is satisfied.

$$s > \min_{0 \le j < k} \left[ \frac{\sum_{0 \le i < L} \{(x_j - \bar{x}) \cdot a_i\}^2}{|x_j - \bar{x}|} \right] \tag{8}$$

A threshold indicated by the right hand side of equation (8) corresponds to a minimum evaluation value s among those obtained by applying equation (7) on each feature position vector $x^T$ of a plurality of registered face images while assuming the feature position vector $x^T$ as the feature position vector $y^T$.

More specifically, according to equation (8), if an angle between the principal component vector $a_i$ and the feature position vector $y^T$ is smaller than a maximum angle among those between the principal component vector $a_i$ and the feature position vector $x^T$, the face in the authentication target face image is determined to be the face in the registered face images.

Accordingly, the principal component analysis is performed on the positions of the facial features in the registered face images. The positions of the facial features in the authentication target image are evaluated using the obtained principal components. Thus, the positions of the facial features in the authentication target face image can be evaluated according to the movement of the facial features that is unique to the subject person and occurs as the facial expression changes. As a result, more accurate face authentication can be performed even if the facial expression differs.

As described above, even if the facial expression change unique to the subject person occurs, the authentication of the subject person can be performed more certainly. In addition, the authentication of whether or not the target person is the subject person can be performed more accurately without unnecessarily lowering the determination threshold.

Additionally, the accuracy of the authentication can be increased using information on the facial expression change unique to the subject person.

In the above description, the thresholds are calculated from the maximum and minimum values. However, the thresholds are not limited to these particular values, and may be set appropriately. For example, the thresholds may be a predetermined rate of the maximum or minimum value. Alternatively, the thresholds may be calculated, after appropriately selecting the positions of the facial features, from the maximum and minimum values of the selected positions.

As described above, the face authentication can be performed by comparing the information regarding the positions of the facial features in the registered face images and the face image to be authenticated. In addition, the positions of the facial features in the face images are detected. The principal component analysis operation is performed on the positions of the facial features in the pre-registered face images. The evaluation value is calculated. The evaluation value is used to evaluate the positions of the facial features in the target face image to be authenticated relative to the principal components resulting from the principal component analysis. The calculated evaluation value is compared with the thresholds determined on the basis of the positions of the facial features in the registered image regarding the principal component. Accordingly, whether the face in the target image matches the face in the registered images is determined. In this case, the face authentication can be performed more accurately even if the facial expressions change.

The series of processing described above can be executed by hardware or software. When the series of processing is executed by software, programs constituting the software are installed in a computer built in dedicated hardware or, for example, a general-purpose personal computer or the like, capable of executing various functions by installing various programs, from program recording media.

Figure 16:
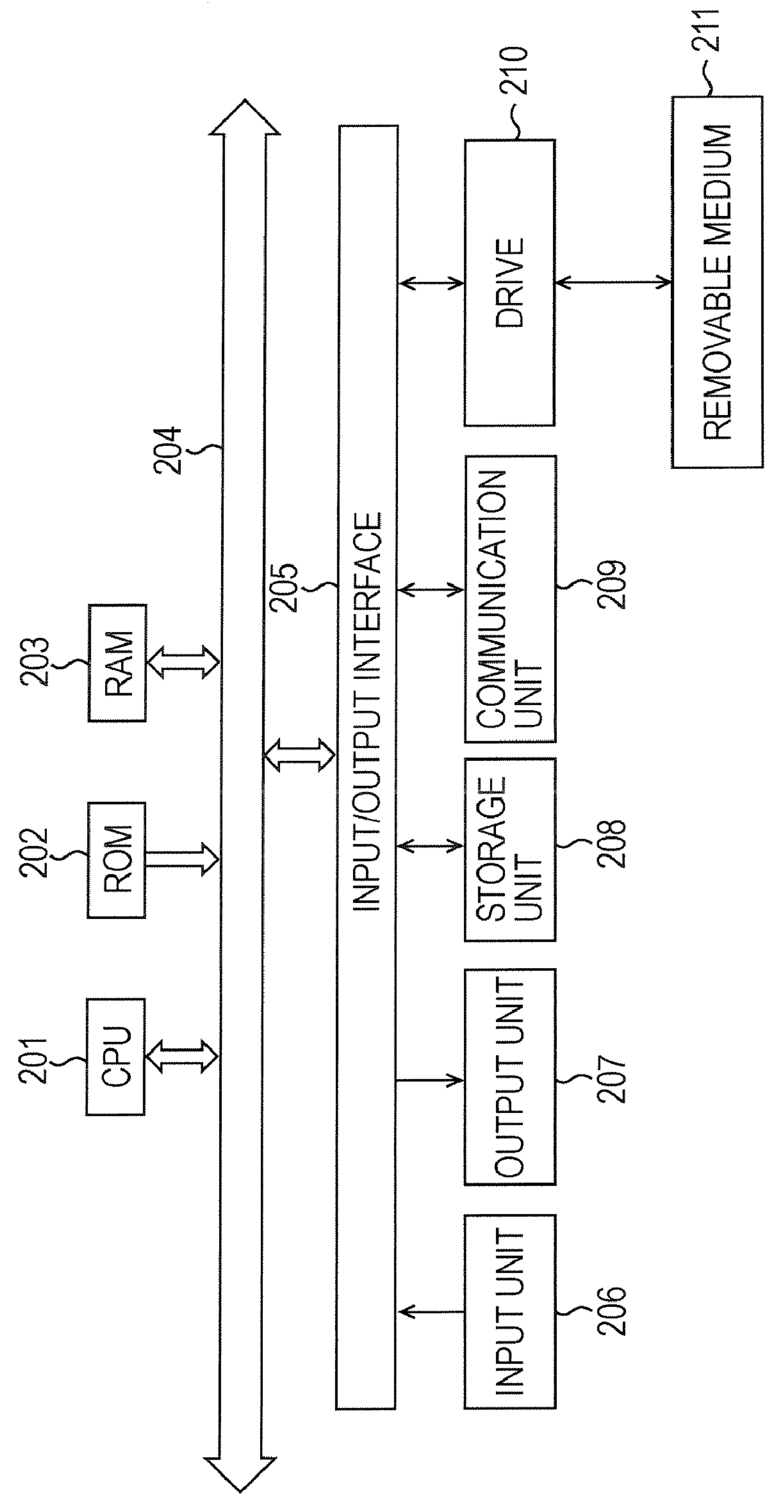
FIG. 16 is a block diagram showing an example of a configuration of a personal computer.

FIG. 16 is a block diagram showing an example of a configuration of a personal computer that executes the above-described series of processing by programs. A CPU (Central Processing Unit) 201 executes various operations according to the programs stored in a ROM (Read Only Memory) 202 or a storage unit 208. A RAM (Random Access Memory) 203 stores programs executed by the CPU 201 and data accordingly. The CPU 201, the ROM 202, and the RAM 203 are connected to each other via a bus 204.

An input/output interface 205 is also connected to the CPU 201 via the bus 204. An input unit 206 and an output unit 207 are connected to the input/output interface 205. The input unit 206 includes a keyboard, a mouse, and a microphone. The output unit 207 includes a display and a speaker. The CPU 201 executes various operations according to commands input with the input unit 206. The CPU 201 then outputs the operation results on the output unit 207.

The storage unit 208 connected to the input/output interface 205 may include, for example, a hard disk, and stores the programs executed by the CPU 201 and various data. A communication unit 209 enables communication to external devices via a network such as the Internet and a local area network.

In addition, the programs may be obtained via the communication unit 209 and stored in the storage unit 208.

A drive 210 connected to the input/output interface 205 drives a removable medium 211 when the removable medium 211 is inserted, and obtains the programs and data recorded thereon. The obtained programs and data are transferred to and stored in the storage unit 208, if necessary. The removable medium 211 may includes a magnetic disk, an optical disc, a magneto-optical disk, and a semiconductor memory.

As shown in FIG. 16, a program recording medium that stores the programs, which is installed in a computer and is brought into an executable state by the computer, may includes the removable medium 211, the ROM 202 temporarily or permanently storing the programs, and the hard disk constituting the storage unit 208. The removable medium 211 is a package medium including a magnetic disk (including a flexible disk), an optical disc (including CD-ROM (Compact Disc-Read Only Memory) and DVD (Digital Versatile Disc)), a magneto-optical disk, and a semiconductor memory. Storage of the programs in the program recording medium is performed using wired or wireless communication media via the communication unit 209, if necessary. The communication unit 209 is an interface such as a router and a modem. The communication media includes the local area network, the Internet, and the digital satellite broadcasting.

Additionally, in this specification, the steps in a program, provided by a program recording medium, include processing that is executed sequentially in the described order, and also includes processing that is executed in parallel or individually, not necessarily sequentially.

Furthermore, the embodiments of the present invention should not be limited to the above-described embodiments, and various modifications can be made without departing from the spirit and scope of the present invention.

What is claimed is:

1. An image processing apparatus comprising:

detecting means for detecting a position of a facial feature in a face image;

principal component analysis performing means for performing a principal component analysis operation on the position of the facial feature in a registered image that is a pre-registered face image to obtain a principal component;

first evaluation value calculating means for calculating a first evaluation value that is used to evaluate the position of the facial feature in a target image, which is a face image to be authenticated, relative to the principal component obtained in the principal component analysis operation; and first determining means for determining whether or not the face in the target image matches the face in the registered image by comparing the calculated first evaluation value with a first threshold set on the basis of the position of the facial feature in the registered image relative to the principal component, wherein the first evaluation value calculated by the first evaluation value calculating means is a square root of a result of subtracting a sum of squares of inner products of a first difference vector and each principal component vector from a magnitude of a first difference vector.

2. The apparatus according to claim 1, wherein the first evaluation value calculating means calculates the first evaluation value relative to the principal component on the basis of the position of the facial feature in the target image and the position of the facial feature in the registered image.

3. The apparatus according to claim 1, wherein the first evaluation value calculated by the first evaluation value calculating means indicates a distance between the principal component and the position of the facial feature in the target image.

4. The apparatus according to claim 3, wherein the first difference vector, results from subtracting a vector indicating a mean value of the positions of the facial features in the registered image from a vector indicating the positions of the facial features in the target image.

5. The apparatus according to claim 4, wherein the first determining means determines that the face in the target image matches the face in the registered image when the first evaluation value is lower than a first threshold, which is a maximum value among square roots of results of subtracting a sum of squares of inner products of a second difference vector and each principal component vector from a square of a magnitude of the second difference vector, which indicates the difference between a vector indicating the positions of the facial features in each registered image and a vector indicating a mean value of the positions of the facial features in the registered image.

6. The apparatus according to claim 1, further comprising:

threshold calculating means for calculating a second threshold, which is in a direction orthogonal to the direction of the first threshold, from the position of the facial feature in the registered image relative to the principal component;

second evaluation value calculating means for calculating a second evaluation value, which is used to the position of the facial feature in the target image relative to the principal component and is in the direction orthogonal to the direction of the first evaluation value; and second determining means for determining whether or not the face in the target image matches the face in the registered image by comparing the second evaluation value with the second threshold.

7. The apparatus according to claim 6, wherein the second threshold calculated by the threshold calculating means is composed of maximum and minimum values of the position of the facial feature in the registered image in a direction of the principal component, and wherein the second evaluation value calculated by the second evaluation value calculating means is an inner product of a difference vector, which results from subtracting the vector indicating the mean value of the positions of facial features in the registered image from the vector indicating each position of facial features in the target image, and the principal component vector indicating each of the principal component, and wherein the second determining means determines whether or not the face in the target image matches the face in the registered image on the basis of whether or not the second evaluation value is within a range indicated by the maximum and minimum values of the second threshold.

8. An image processing method comprising the steps of:

detecting a position of a facial feature in a face image;

performing a principal component analysis operation on the position of the facial feature in a registered image that is a pre-registered face image;

calculating a evaluation value that is used to evaluate the position of the facial feature in a target image, which is a face image to be authenticated, relative to the principal component obtained in the principal component analysis operation; and determining whether or not the face in the target image matches the face in the registered image by comparing the calculated evaluation value with a threshold set on the basis of the position of the facial feature in the registered image relative to the principal component, wherein the evaluation value is a square root of a result of subtracting a sum of squares of inner products of a first difference vector and each principal component vector from a magnitude of a first difference vector.

9. A recording medium having a program causing a computer to execute a process recorded thereon, the process comprising the steps of:

detecting a position of a facial feature in a face image;

performing a principal component analysis operation on the position of the facial feature in a registered image that is a pre-registered face image;

calculating an evaluation value that is used to evaluate the position of the facial feature in a target image, which is a face image to be authenticated, relative to the principal component obtained in the principal component analysis operation; and determining whether or not the face in the target image matches the face in the registered image by comparing the calculated evaluation value with a threshold set on the basis of the position of the facial feature in the registered image relative to the principal component, wherein the evaluation value is a square root of a result of subtracting a sum of squares of inner products of a first difference vector and each principal component vector from a magnitude of a first difference vector.

10. An image processing apparatus comprising:

a detecting unit for detecting a position of a facial feature in a face image;

a principal component analysis performing unit for performing a principal component analysis operation on the position of the facial feature in a registered image that is a pre-registered face image to obtain a principal component;

a first evaluation value calculating unit for calculating a first evaluation value that is used to evaluate the position of the facial feature in a target image, which is a face image to be authenticated, relative to the principal component obtained in the principal component analysis operation; and a first determining unit for determining whether or not the face in the target image matches the face in the registered image by comparing the calculated first evaluation value with a first threshold set on the basis of the position of the facial feature in the registered image relative to the principal component, wherein the first evaluation value is a square root of a result of subtracting a sum of squares of inner products of a first difference vector and each principal component vector from a magnitude of a first difference vector.

* * * * *